US012576891B2

(12) United States Patent     (10) Patent No.:   US 12,576,891 B2

Kume et al.     (45) Date of Patent:    Mar. 17, 2026

(54) VEHICLE CONTROL DEVICE AND VEHICLE CONTROL METHOD

(71) Applicant: DENSO CORPORATION, Kariya-city (JP)

(72) Inventors: Takuya Kume, Kariya-city (JP); Kazuki Izumi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 18/676,063

(22) Filed: May 28, 2024

(65) Prior Publication Data

US 2024/0317274 A1    Sep. 26, 2024

Related U.S. Application Data

(63) Continuation of application No. PCT/JP2022/042955, filed on Nov. 21, 2022.

(30) Foreign Application Priority Data

Dec. 2, 2021   (JP) ................................. 2021-196332
Nov. 16, 2022   (JP) ................................. 2022-183644

(51) Int. Cl.
*B60W 30/182*     (2020.01)
*B60W 30/14*     (2006.01)
(Continued)

(52) U.S. Cl.
CPC ........ *B60W 60/005* (2020.02); *B60W 30/143* (2013.01); *B60W 30/16* (2013.01);
(Continued)

(58) Field of Classification Search
CPC .. B60W 60/005; B60W 30/143; B60W 30/16; B60W 30/182; B60W 50/14; B60W 60/00133; B60W 2420/403; B60W 2540/229; B60W 2552/30; B60W 2554/802; B60W 2720/106;
(Continued)

(56) References Cited

U.S. PATENT DOCUMENTS

| | | | |
|---|---|---|---|
| 2018/0326996 A1 | 11/2018 | Fujisawa et al. | |
| 2018/0373250 A1 | 12/2018 | Nakamura et al. | |
| 2021/0221401 A1 | 7/2021 | Komori et al. | |
| 2022/0274621 A1 | 9/2022 | Ota et al. | |

(Continued)

FOREIGN PATENT DOCUMENTS

| | | | | |
|---|---|---|---|---|
| CA | 3093436 A1 | * | 3/2021 | ........ B60W 30/0953 |
| CN | 115195720 A | * | 10/2022 | ............ B60W 10/08 |

(Continued)

*Primary Examiner* — Justin Holmes
(74) *Attorney, Agent, or Firm* — Harness, Dickey & Pierce, P.L.C.

(57) ABSTRACT

A vehicle control device specifies a travel location of a subject vehicle; and executes a location target speed control, which is a speed control with respect to a location as a control target for automatically changing a speed of the vehicle when a travel location of the vehicle is a specific location where a speed change of the vehicle is required due to a structure of a road. The vehicle control device executes the location target speed control differently depending on whether the subject vehicle is in the autonomous driving with monitoring obligation or in the autonomous driving with no monitoring obligation.

30 Claims, 17 Drawing Sheets

(51) Int. Cl.
    *B60W 30/16*     (2020.01)
    *B60W 50/14*     (2020.01)
    *B60W 60/00*     (2020.01)

(52) U.S. Cl.
    CPC .......... *B60W 30/182* (2013.01); *B60W 50/14* (2013.01); *B60W 60/00133* (2020.02); *B60W 2420/403* (2013.01); *B60W 2540/229* (2020.02); *B60W 2552/30* (2020.02); *B60W 2554/802* (2020.02); *B60W 2720/106* (2013.01)

(58) Field of Classification Search
    CPC ............... B60W 30/146; B60W 30/17; B60W 60/0055; B60W 2552/05; B60W 2552/20; B60W 2556/50; B60W 2720/10; B60W 30/162; B60W 30/18163; G08G 1/16
    See application file for complete search history.

(56) References Cited

U.S. PATENT DOCUMENTS

| | | |
|---|---|---|
| 2022/0289228 A1 | 9/2022 | Yamamoto et al. |
| 2023/0030288 A1 | 2/2023 | Matsumoto et al. |

FOREIGN PATENT DOCUMENTS

| | | | |
|---|---|---|---|
| JP | H1019595 A | | 1/1998 |
| JP | 2005324661 A | | 11/2005 |
| JP | 2019006275 A | | 1/2019 |
| JP | 2019074978 A | | 5/2019 |
| JP | 2019101453 A | | 6/2019 |
| JP | 2020163966 A | | 10/2020 |
| JP | 2021089720 A | | 6/2021 |
| JP | 2021091394 A | | 6/2021 |
| JP | 2021112995 A | | 8/2021 |
| JP | 2021170318 A | * | 10/2021 |
| JP | 2021172221 A | | 11/2021 |
| WO | WO-2017081919 A1 | | 5/2017 |

* cited by examiner

FIG. 3

| SPECIFIC LOC | 1ST SPEED CONT |
|---|---|
| CURVE ROAD | DECELERATE |
| IC | DECELERATE |
| INTERSECTION | DECELERATE |
| MERGE POINT | ACCELERATE |

| TRAVEL LOC | WITH MON OBLI | WITH NO MON OBLI |
|---|---|---|
| TARGET CURVE ROAD | — | DECELERATE |
| IC | — | DECELERATE |
| GO STRAIGHT THROUGH INTERSECTION | — | — |
| TURN RIGHT/LEFT AT INTERSECTION | — | DECELERATE |
| MERGE POINT | — | RESTRICT ACCELERATION |

FIG. 10

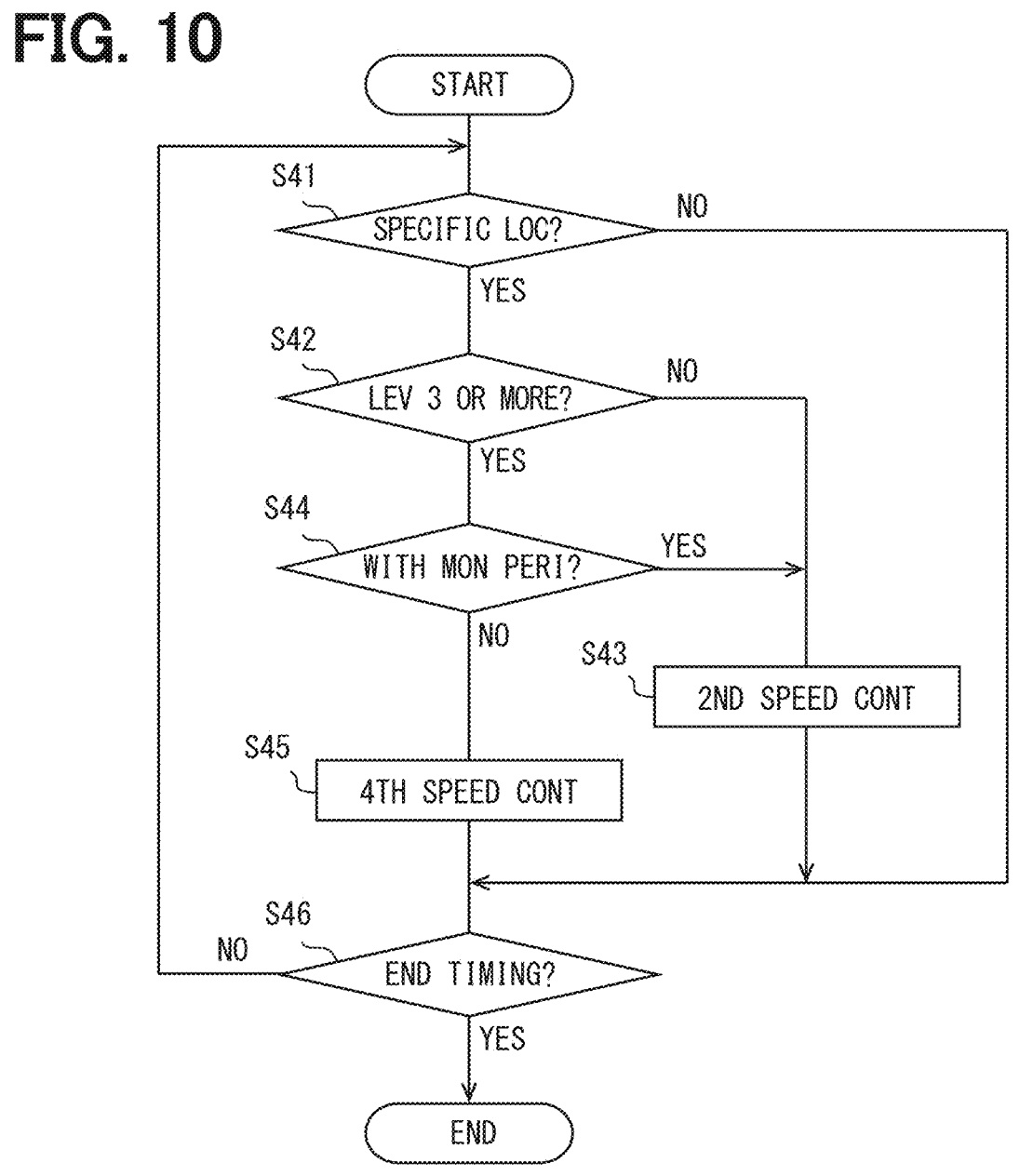

START

S41 SPECIFIC LOC? — NO

YES

S42 LEV 3 OR MORE? — NO

YES

S44 WITH MON PERI? — YES

NO

S43 2ND SPEED CONT

S45 4TH SPEED CONT

S46 END TIMING? — NO

YES

END

Figure 17:
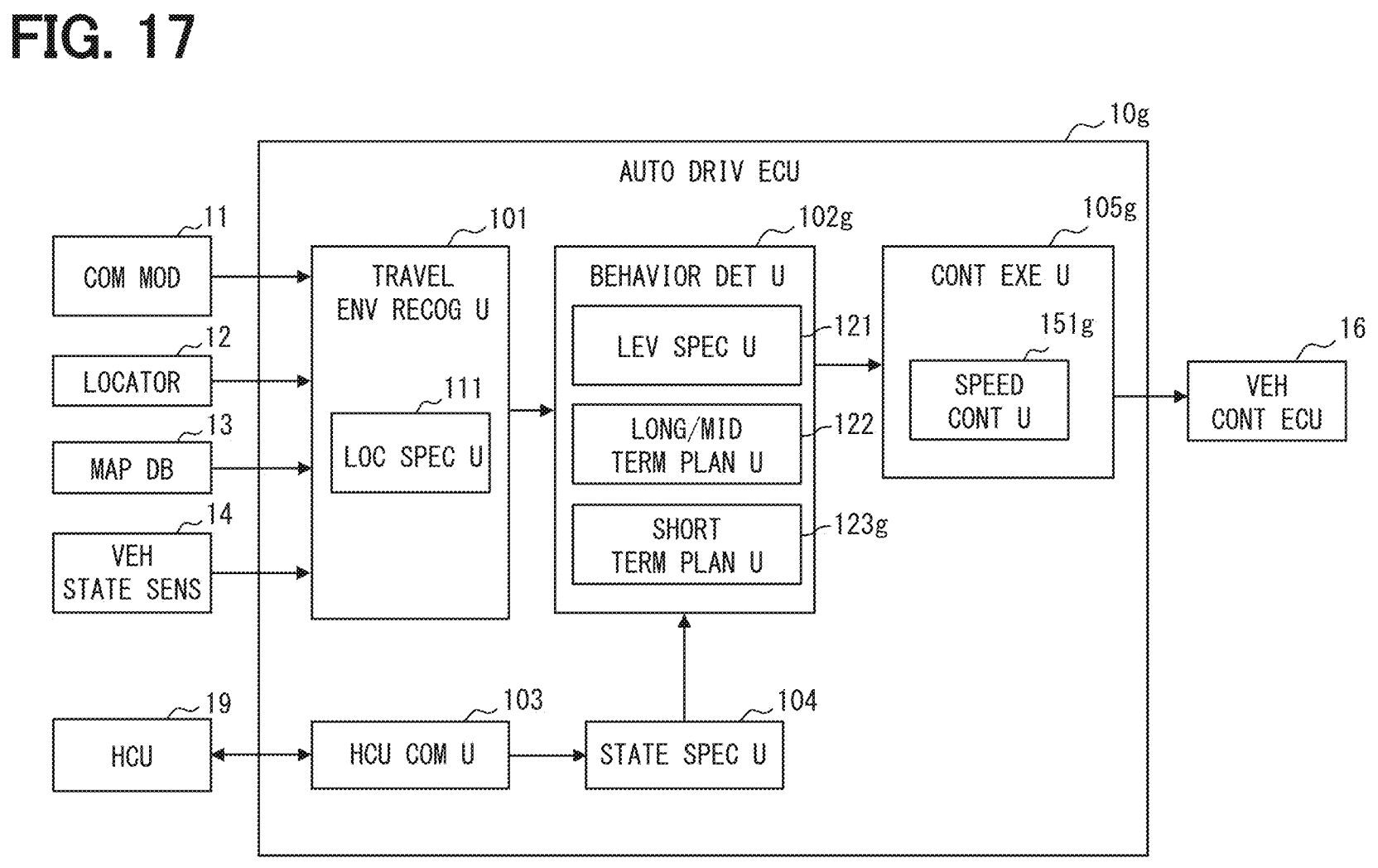

VEH
CONT ECU

16

10g

CONT EXE U

105g

SPEED
CONT U

151g

VEH
CONT ECU

AUTO DRIV ECU

BEHAVIOR DET U

102g

LEV SPEC U

121

LONG/MID
TERM PLAN U

122

SHORT
TERM PLAN U

123g

TRAVEL
ENV RECOG U

101

LOC SPEC U

111

STATE SPEC U

104

HCU COM U

103

COM MOD

11

LOCATOR

12

MAP DB

13

VEH
STATE SENS

14

HCU

VEHICLE CONTROL DEVICE AND VEHICLE CONTROL METHOD

CROSS REFERENCE TO RELATED APPLICATION

The present application is a continuation application of International Patent Application No. PCT/JP2022/042955 filed on Nov. 21, 2022, which designated the U.S. and claims the benefit of priority from Japanese Patent Applications No. 2021-196332 filed on Dec. 2, 2021 and No. 2022-183644 filed on Nov. 16, 2022. The entire disclosures of all of the above applications are incorporated herein by reference.

TECHNICAL FIELD

The present disclosure relates to a vehicle control device and a vehicle control method.

BACKGROUND

According to a conceivable technique, an autonomous driving control unit includes autonomous driving functions from level 1 to level 5 in addition to the manual driving function at level 0.

For example, the automation level classified into levels 0 to 5 defined by SAE are known. Level 0 is a level where the driver performs all driving tasks without any intervention of the system. The level 0 corresponds to so-called manual driving. The level 1 is a level where the system assists a steering operation or an acceleration and deceleration operation. The level 2 is a level where the system assists both the steering operation and the acceleration and deceleration operation. The autonomous driving at the levels 1 and 2 is autonomous driving in which a driver has an obligation of monitoring related to the safety driving operation (hereinafter simply referred to as a monitoring obligation). The level 3 is a level where the system is capable of performing all driving tasks in specific locations such as highways. The level 4 is a level where the system is capable of performing all driving tasks, except under a specific circumstance, such as an unsupported road, an extreme environment, and the like. The level 5 is a level where the system is capable of performing all driving tasks in any situation. The autonomous driving at the level 3 or higher is autonomous driving in which the driver has no monitoring obligation. The autonomous driving at level 4 or higher is autonomous driving in which the driver is allowed to sleep.

Further, another conceivable technique teaches a technique for decelerating the vehicle by automatically controlling a brake system when traveling on a curve.

SUMMARY

According to an example, a vehicle control device may specify a travel location of a subject vehicle; and execute a location target speed control, which is a speed control with respect to a location as a control target for automatically changing a speed of the vehicle when a travel location of the vehicle is a specific location where a speed change of the vehicle is required due to a structure of a road. The vehicle control device may execute the location target speed control differently depending on whether the subject vehicle is in the autonomous driving with monitoring obligation or in the autonomous driving with no monitoring obligation.

BRIEF DESCRIPTION OF THE DRAWINGS

The above and other objects, features and advantages of the present disclosure will become more apparent from the following detailed description made with reference to the accompanying drawings. In the drawings:

FIG. 3 is a diagram for explaining an example of the relationship between a specific location and acceleration/deceleration of first speed control;

FIG. 10 is a flowchart showing an example of the flow of a speed control related process in the autonomous driving ECU according to the fourth embodiment;

FIG. 11 is a diagram illustrating an example of a schematic configuration of an autonomous driving ECU;

FIG. 12 is a diagram illustrating an example of a schematic configuration of an autonomous driving ECU;

FIG. 15 is a diagram illustrating an example of a schematic configuration of an autonomous driving ECU;

FIG. 17 is a diagram illustrating an example of a schematic configuration of an autonomous driving ECU; and FIG. 18 is a diagram illustrating an example of a schematic configuration of an autonomous driving ECU.

DETAILED DESCRIPTION

Figure 1:
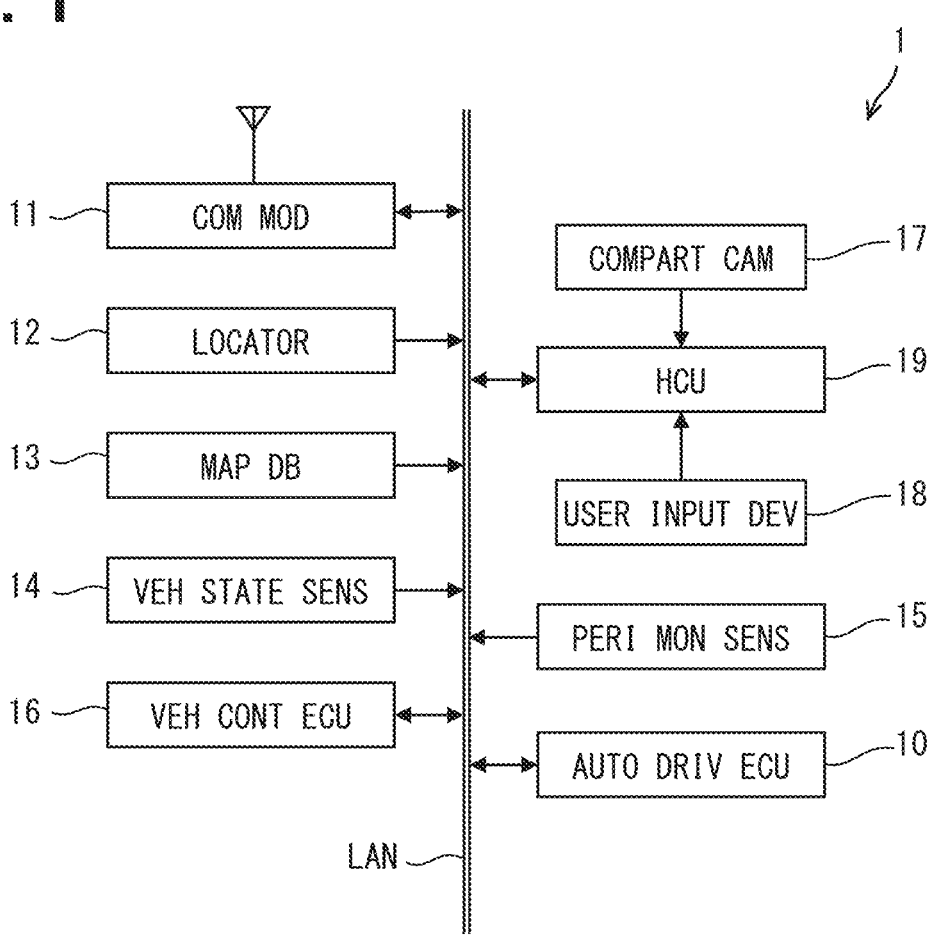
FIG. 1 is a diagram showing an example of a schematic configuration of a vehicle system.

In the conceivable technique, it is not considered to execute the speed control of a subject vehicle when the speed change of the subject vehicle is necessary, differently depending on whether the subject vehicle is travelling in the autonomous driving operation with no monitoring obligation of a driver (hereinafter referred to as autonomous driving with no monitoring obligation) or in the autonomous driving operation with monitoring obligation of the driver (hereinafter referred to as autonomous driving with monitoring obligation). Therefore, in the conceivable technique, when performing deceleration control in a location where the deceleration is likely to be required due to the structure of a road such as a curve, it is not possible to execute the speed control differently depending on whether the subject vehicle is in the autonomous driving operation with no monitoring obligation or in the autonomous driving operation with monitoring obligation There may be a high possibility of a difference in how the driver spends time in a compartment of the subject vehicle depending on whether the subject vehicle is travelling in the autonomous driving with no monitoring obligation or in the autonomous driving with the monitoring obligation. If there is the difference in how the driver spends time in the compartment of the subject vehicle between no monitoring obligation and the monitoring obligation, a possibility is also high such that the speed control required by the driver is different between no monitoring obligation and the monitoring obligation. On the other hand, in the conceivable technique, it is not possible to perform the speed control required by the driver, and convenience for the driver may be reduced.

One aspect of the present embodiments is to provide a vehicle control device and a vehicle control method that make it possible to suppress a reduction in convenience for the driver when performing the speed control of the subject vehicle during autonomous driving with no monitoring obligation.

In order to achieve the above aspect, the vehicle control device of the present disclosure is useable for a vehicle in which an autonomous driving operation with no monitoring obligation that a driver of the vehicle has no monitoring obligation of a periphery during the autonomous driving operation and an autonomous driving operation with monitoring obligation that the driver of the vehicle has monitoring obligation of the periphery during the autonomous driving operation are switchable.

The vehicle control device includes: a location specifying unit that specifies a location where the vehicle is traveling; and a speed control unit that performs location target speed control for controlling speed of the vehicle with respect to a location as a target by changing the speed of the vehicle automatically when the location where the vehicle is travelling specified by the location specifying unit is a specific location where a speed change of the vehicle is required according to a structure of a road. The speed control unit executes the location target speed control differently depending on whether the vehicle is in the autonomous driving operation with monitoring obligation or in the autonomous driving operation with no monitoring obligation.

In order to achieve the above aspect, the vehicle control method of the present disclosure is useable for a vehicle in which an autonomous driving operation with no monitoring obligation that a driver of the vehicle has no monitoring obligation of a periphery during the autonomous driving operation and an autonomous driving operation with monitoring obligation that the driver of the vehicle has monitoring obligation of the periphery during the autonomous driving operation are switchable.

The vehicle control method includes, by at least one processor, a location specifying step for specifying a location where the vehicle is traveling; and a speed control step for performing location target speed control for controlling speed of the vehicle with respect to a location as a target by changing the speed of the vehicle automatically when the location where the vehicle is travelling specified in the location specifying step is a specific location where a speed change of the vehicle is required according to a structure of a road. The speed control step includes executing the location target speed control differently depending on whether the vehicle is in the autonomous driving operation with monitoring obligation or in the autonomous driving operation with no monitoring obligation.

According to the above configuration, it is possible to execute the location target speed control, for changing the speed of the vehicle automatically when the location where the vehicle is travelling is a specific location where a speed change of the vehicle is required according to the structure of the road, differently depending on whether the vehicle is in the autonomous driving operation with monitoring obligation or in the autonomous driving operation with no monitoring obligation. Therefore, it is possible to perform the location target speed control required by the driver depending on whether the vehicle is in the autonomous driving operation with monitoring obligation or in the autonomous driving operation with no monitoring obligation. As a result, it is possible to suppress a reduction in convenience for the driver when performing the speed control of the vehicle during the autonomous driving with no monitoring obligation.

A plurality of embodiments will be described with reference to the drawings. For convenience of description, any part functioning identically to a part depicted in any figure having been referred to in foregoing description will be denoted by an identical reference symbol and may not be described repeatedly in the following embodiments. For the configuration having the same reference symbol as in the previous embodiment, detailed description may be omitted in other embodiments.

First Embodiment

<Schematic Configuration of Vehicle System 1>

Hereinafter, a first embodiment according to the present disclosure will be described with reference to the drawings. A vehicle system 1 shown in FIG. 1 can be used for a vehicle configured to perform autonomous driving (hereinafter referred to as an autonomous driving vehicle). As shown in FIG. 1, the vehicle system 1 includes an autonomous driving ECU 10, a communication module 11, a locator 12, a map database (hereinafter referred to as map DB) 13, a vehicle state sensor 14, a periphery monitoring sensor 15, a vehicle control ECU 16, a vehicle compartment camera 17, an user input device 18, and a HCU (Human Machine Interface Control Unit) 19. For example, the autonomous driving ECU 10, the communication module 11, the locator 12, the map DB 13, the vehicle state sensor 14, the periphery monitoring sensor 15, the vehicle control ECU 16, and the HCU 19 may be configured to be connected to an in-vehicle LAN (see LAN in FIG. 1). Although the vehicle using the vehicle system 1 is not necessarily limited to an automobile, hereinafter, an example using the automobile will be described.

There may be a plurality of stages (hereinafter, referred to as automation levels) of autonomous driving of an autonomous driving vehicle, for example, as defined by SAE (the Society of Automotive Engineers). This automation level is classified into, for example, five levels including LV 0 to LV 5 as follows.

LV 0 is a level at which a driver performs all driving tasks without intervention of the system. The driving tasks may be rephrased as dynamic driving tasks. The driving tasks are, for example, a steering operation, an acceleration and deceleration operation, and a periphery monitoring operation. The LV 0 corresponds to so-called manual driving. The LV 1 is a level at which the system supports either the steering operation or the acceleration and deceleration operation. The LV 1 corresponds to so-called driving assistance. The LV 2 is a level at which the system supports both the steering operation and the acceleration and deceleration operation. The LV 2 corresponds to so-called partial driving automation. The LV1 and LV2 are also part of autonomous driving.

For example, the autonomous driving at LV 1 and LV 2 is autonomous driving in which a driver has an obligation of monitoring related to safety driving operation (hereinafter simply referred to as a monitoring obligation). That is, this corresponds to autonomous driving with the monitoring obligation. The monitoring obligation includes visual monitoring of a periphery of the vehicle. The autonomous driving at LV1 and 2 can be rephrased as autonomous driving in which a second task is not permitted. The second task is an action other than driving operation permitted for the driver, and is a specific action defined in advance. The second task can be rephrased as an operation other than the driving task. The second task can also be rephrased as a secondary activity, other activities, or the like. The second task must not prevent the driver from responding to a request to take over a driving operation from an autonomous driving system. As an example, viewing of a content such as a video, operation of a smartphone, reading a book, and eating may be assumed as the second task.

The LV 3 of the autonomous driving is a level where the system performs all driving tasks under certain conditions, and the driver performs the driving operation in an emergency situation. In the autonomous driving at the LV3, it is required that the driver can quickly respond to a request of driving takeover from the system. The driving takeover can also be rephrased as transfer of the periphery monitoring obligation from the vehicle system to the driver. The LV 3 corresponds to so-called conditional driving automation. The LV 3 includes an area limit LV 3 limited to a specific area. The specific area described here may be an expressway. The specific area may be, for example, a specific lane. The LV 3 also includes a traffic congestion limit LV 3 that is limited to traffic congestion. The autonomous driving at the traffic congestion limit LV 3 corresponds to autonomous driving limited to traffic congestion. The traffic congestion limit LV 3 may be limited to traffic congestion in, for example, the expressway. The expressway may include the automobile road.

The autonomous driving at the LV4 is at a level at which the system can perform all the driving tasks except for a specific situation such as an unsupported road, an extreme environment, and the like. The LV 4 corresponds to so-called advanced driving automation. The LV 5 of the autonomous driving is a level at which the system can perform all the driving tasks under all environments. The LV 5 corresponds to a full driving automation. The autonomous driving of LV4 and LV5 may be implemented, for example, in a traveling section where high-precision map data is prepared. The high-precision map data will be described later.

For example, the autonomous driving at LV 3 to LV 5 is an autonomous driving in which the driver does not have the monitoring obligation. In other words, the autonomous driving at LV 3 to LV 5 corresponds to autonomous driving with no monitoring obligation. The autonomous driving at LV 3 to LV 5 can be rephrased as autonomous driving in which the second task is permitted. Among the autonomous driving at LV 3 to LV 5, the autonomous driving at LV 4 or higher corresponds to the autonomous driving in which sleeping of the driver is permitted. In other words, the autonomous driving at LV 4 or higher corresponds to autonomous driving with sleep permission. The autonomous driving at LV4 or higher can also be rephrased as autonomous driving that does not require the driver to take over the driving operation even in an emergency. Among the autonomous driving at LV 3 to LV 5, the autonomous driving at LV 3 corresponds to autonomous driving in which the driver is not permitted to sleep (hereinafter referred to as autonomous driving without sleep permission). The autonomous driving vehicle of the present embodiment is capable of switching the automation level. The automation levels may be configured to be switchable only between a part of the levels among LV 0 to LV 5. The autonomous driving vehicle of this embodiment is capable of switching at least between the autonomous driving with no monitoring obligation and autonomous driving with monitoring obligation.

The communication module 11 transmits and receives information to and from a center outside the vehicle via wireless communications. That is, the communication module 11 performs a wide area communication. The communication module 11 receives traffic congestion information and the like from the center through the wide area communication. The communication module 11 may transmit and receive information to and from other vehicles via the wireless communication. In other words, the communication module 11 may perform a vehicle-to-vehicle communication. The communication module 11 may transmit and receive information via the wireless communication with a roadside device arranged on a roadside. In other words, the communication module 11 may perform a road-to-vehicle communication. When performing the road-to-vehicle communication, the communication module 11 may receive peripheral vehicle information transmitted from the vehicle positioned in the periphery of the vehicle via the roadside device. Further, the communication module 11 may receive information about a peripheral vehicle transmitted from the vehicle positioned in the periphery of the subject vehicle via the center by the wide area communication.

The locator 12 includes a GNSS (Global Navigation Satellite System) receiver and an inertial sensor. The GNSS receiver receives positioning signals from multiple positioning satellites. The inertial sensor includes, for example, a gyro sensor and an acceleration sensor. The locator 12 combines the positioning signals received by the GNSS receiver with a measurement result of the inertial sensor to sequentially detect the position of the subject vehicle (hereinafter, a subject vehicle position) on which the locator 12 is mounted. The subject vehicle position may include, for example, coordinates of latitude and longitude. The subject vehicle position may be measured by using a travel distance acquired from signals sequentially output from a vehicle speed sensor mounted on the vehicle and described later.

The map DB 13 is a non-volatile memory and stores the high-precision map data. The high-precision map data is map data with higher precision than the map data used for route guidance in a navigation function. The map DB 13 may also store map data used for route guidance. The high-precision map data includes information that can be used for the autonomous driving operation, such as, for example, three-dimensional road shape information, information on the number of lanes, and information indicating the traveling direction allowed for each lane. In addition, the high-precision map data may also include, for example, a node point information indicating the positions of both ends of a road marking such as a lane marking. The locator 12 may be configured without the GNSS receiver by using the three-dimensional shape information of the road. For example, the locator 12 may be configured to specify the subject vehicle position by using the three-dimensional shape information of the road and a detection result of the periphery monitoring sensor 15 such as a LiDAR (Light Detection and Ranging/Laser Imaging Detection and Ranging) that detects a point group of feature points of the road shape and the structure on the road or a periphery monitoring camera. The three-dimensional shape information of the road may be generated based on a captured image by REM (Road Experience Management).

The map data distributed from an external server may be received, for example, through the wide area communications by a communication module 11 and stored in the map DB 13. In this case, the map DB 13 may be a volatile memory, and the communication module 11 may sequentially acquire the map data of an area corresponding to the subject vehicle position.

The vehicle state sensor 14 is a sensor group for detecting various states of the subject vehicle. The vehicle state sensor 14 includes a vehicle speed sensor and the like. The vehicle speed sensor detects the speed of the subject vehicle. The vehicle state sensor 14 outputs detected sensing information to the in-vehicle LAN. Here, the sensing information detected by the vehicle state sensor 14 may be output to the in-vehicle LAN via an ECU mounted on the subject vehicle.

The periphery monitoring sensor 15 monitors a peripheral environment of the subject vehicle. For example, the periphery monitoring sensor 15 detects an obstacle in a periphery of the subject vehicle, such as a pedestrian, a mobile object like an other vehicle, and a stationary object such as a fallen object on the road. The periphery monitoring sensor 15 further detects a road surface marking such as a traffic lane marking around the subject vehicle. The periphery monitoring sensor 15 is, for example, a sensor such as a periphery monitoring camera that captures a predetermined range in the periphery of the subject vehicle, a millimeter wave radar that transmits a search wave in a predetermined range around the subject vehicle, a sonar, or a LiDAR. For example, the predetermined range may be a range at least partially including the front area, the rear area, the left area, or the right area of the subject vehicle. The periphery monitoring camera sequentially outputs, as sensing information, sequentially captured images to the autonomous driving ECU 10. A sensor that transmits a search wave, such as a sonar, a millimeter-wave radar, or a LIDAR, sequentially outputs a scanning result, based on a reception signal obtained when a reflected wave reflected by an obstacle is received, to the autonomous driving ECU 10 as the sensing information. The sensing information detected by the periphery monitoring sensor 15 may be output to the autonomous driving ECU 10 without passing through the in-vehicle LAN.

The vehicle control ECU 16 is an electronic control unit configured to perform a traveling control of the subject vehicle. The traveling control includes an acceleration and deceleration control and/or a steering control. The vehicle control ECU 16 includes a steering ECU that performs the steering control, a power unit control ECU and a brake ECU that perform the acceleration and deceleration control, and the like. The vehicle control ECU 16 is configured to output a control signal to a traveling control device such as an electronic control throttle, a brake actuator, and an EPS (Electric Power Steering) motor mounted on the subject vehicle thereby to perform the traveling control.

The vehicle compartment camera 17 captures an image of a predetermined range in the vehicle compartment of the subject vehicle. It may be preferable that the vehicle compartment camera 17 captures the range including the driver seat of the subject vehicle at least. The vehicle compartment camera 17 may capture an image in an area including the passenger seat, and the rear seat of the subject vehicle in addition to the driver seat. The vehicle compartment camera 17 includes, for example, a near-infrared light source, a near-infrared camera unit, and a control unit that controls these components. The vehicle compartment camera 17 uses the near-infrared camera to capture an image of the passenger of the subject vehicle to which the near-infrared light is emitted from the near-infrared light source. An image captured by the near-infrared camera is analyzed by the control unit. The control unit analyzes the captured image to detect the feature amount of the passenger's face. The control unit may detect the passenger's face orientation, the line of sight of the passenger, the passenger's posture, an awakening level, and the like, based on the detected feature amount of the upper body including the passenger's face. The awakening level may be detected based on, for example, an opening or closing degree of an eyelid of the passenger.

The user input device 18 receives an input from the user. The user input device 18 may be an operation device that receives an operation input from the user. The operation device may be a mechanical switch, or may be a touch switch integrated with the display. An example of a display provided with a touch switch is a CID (Center Information Display). The CID is a display device located at a center of an instrument panel of the subject vehicle. The user input device 18 is not limited to the operation device that receives the operation input as long as the user input device 18 receives the input from the user. For example, the user input device 18 may be a sound input device that receives a command input by a sound such as a voice from the user.

The HCU 19 mainly includes a computer including a processor, a volatile memory, a nonvolatile memory, an I/O, and a bus connecting these devices. The HCU 19 is connected to the vehicle compartment camera 17 and the user input device 18. The HCU 19 executes various processing related to an interaction between a passenger and a system of the subject vehicle by executing a control program stored in the nonvolatile memory. The HCU 19 receives an input from a passenger such as the driver of the subject vehicle via the user input device 18. The HCU 19 executes a process for estimating the state of the driver (hereinafter referred to as a state estimation process).

As the state estimation process, it may be preferable that the HCU 19 estimates whether the driver is in a sleeping state or an awake state. The HCU 19 may estimate whether the driver is in a sleeping state or an awake state from the wakening level detected by the vehicle compartment camera 17. The HCU 19 may estimate whether the driver is in a sleeping state or an awake state from the driver's biological information measured by a biological sensor. The biological sensor may be provided in the subject vehicle or may be provided in a wearable device worn by the driver. When a biological sensor is provided in the subject vehicle, the biological sensor may be provided, for example, on the steering wheel. When a biological sensor is provided in a wearable device, the HCU 19 may acquire biological information via a short-range communication module. Examples of the biological information measured by the biological sensor include respiration, pulse, heartbeat, and the like. Here, the biological sensor may be configured to measure biological information other than the respiration, the pulse, and the heartbeat. For example, the biological sensor may measure heartbeat fluctuation, perspiration, body temperature, blood pressure, skin conductance, and the like.

As the state estimation process, it may be preferable that the HCU 19 estimates whether or not the driver is monitoring the periphery area. The HCU 19 may estimate whether the driver is monitoring the periphery according to the driver's face direction, line-of-sight direction, and the like detected by the vehicle compartment camera 17. As the state estimation process, it may be preferable that the HCU 19 estimates whether or not the driver is performing the second task. The HCU 19 may estimate whether or not the driver is performing the second task based on the driver's face direction, the line of sight direction, the posture, and the like detected by the vehicle compartment camera 17. The HCU 19 may estimate whether the driver is performing the second task based on the input received by the user input device 18. For example, the HCU 19 may estimate whether the driver is performing a second task based on the fact that the touch switch integrated with the CID is receiving an input.

The autonomous driving ECU 10 mainly includes a computer including a processor, a volatile memory, a non-volatile memory, an I/O, and a bus connecting these devices. The autonomous driving ECU 10 executes processing related to the autonomous driving by executing a control program stored in the nonvolatile memory. The autonomous driving ECU 10 corresponds to a vehicle control device. In this embodiment, the autonomous driving ECU 10 is used in a vehicle in which the autonomous driving with no monitoring obligation and the autonomous driving with monitoring obligation are switchable at least. The configuration of the autonomous driving ECU 10 will be described in detail below.

<Schematic Configuration of Autonomous Driving ECU 10>

Figure 2:
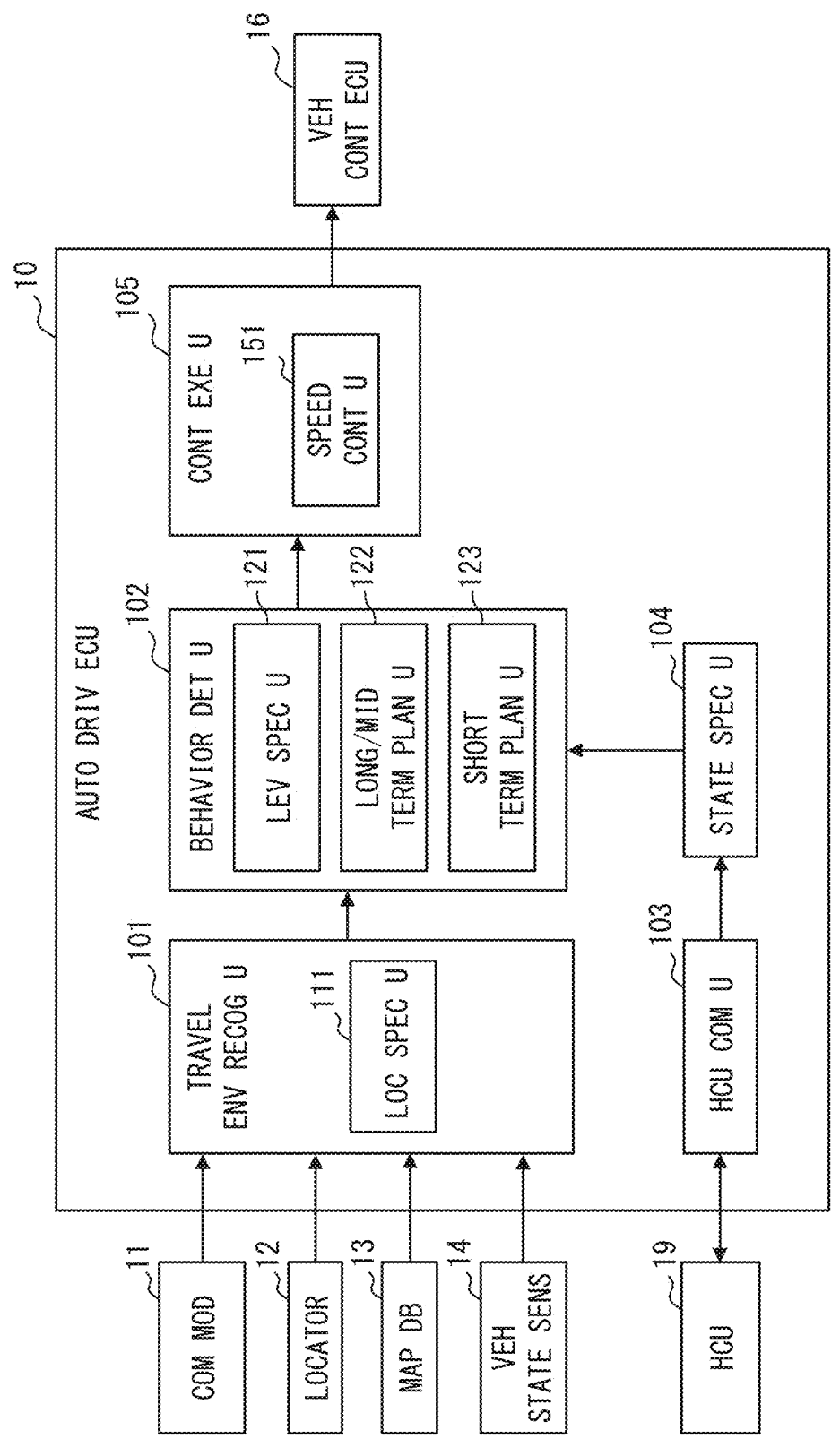
FIG. 2 is a diagram illustrating an example of a schematic configuration of an autonomous driving ECU.

Next, a schematic configuration of the autonomous driving ECU 10 will be described with reference to FIG. 2. As shown in FIG. 2, the autonomous driving ECU 10 includes a travel environment recognition unit 101, a behavior determination unit 102, an HCU communication unit 103, a state specifying unit 104, and a control execution unit 105 as functional blocks. The execution of the processes of the functional blocks of the autonomous driving ECU 10 by the computer corresponds to execution of a vehicle control method. Some or all of the functions executed by the autonomous driving ECU 10 may be implemented as hardware with one or more ICs or the like. Some or all of the functional blocks included in the autonomous driving ECU 10 may be implemented by a combination of execution of software by a processor and a hardware element.

The travel environment recognition unit 101 recognizes a travel environment of the subject vehicle from the subject vehicle position acquired from the locator 12, the map data acquired from the map DB 13, and the sensing information acquired from the periphery monitoring sensor 15. The travel environment recognition unit 110 corresponds to a travel environment specifying unit. As one example, with use of these information, the travel environment recognition unit 101 recognizes a position, a shape and a movement state of an object in the periphery of the subject vehicle, and generates a virtual space in which the actual traveling environment is reproduced. The travel environment recognition unit 101 may recognize presence, a relative position with respect to the subject vehicle, a relative speed with respect to the subject vehicle, and the like for a peripheral vehicle and a pedestrian that are disposed in the periphery of the subject vehicle from the sensing information acquired from the periphery monitoring sensor 15, as the traveling environment. The travel environment recognition unit 101 may recognize the position of the subject vehicle on the map from the subject vehicle position and the map data. In a case where position information, speed information, and the like of the peripheral vehicle can be acquired via the communication module 11, the travel environment recognition unit 101 may recognize the traveling environment using these items of information.

The travel environment recognition unit 101 includes a location specifying unit 111 as a sub-functional block. The location specifying unit 111 specifies the location where the subject vehicle is traveling. The location specifying unit 111 may specify the location where the subject vehicle is traveling based on the location of the subject vehicle on the map. This process by the location specifying unit 111 corresponds to a location specifying step.

The travel environment recognition unit 101 may also determine a manual driving area (hereinafter, referred to as an MD area) in a traveling area of the subject vehicle. The travel environment recognition unit 101 may determine an autonomous driving area (hereinafter referred to as an AD area) in the travelling area of the subject vehicle. The travel environment recognition unit 101 may also distinguish between an ST section and a non-ST section, which will be described later, in the AD area.

The MD area is an area where the autonomous driving is prohibited. In other words, the MD area is defined as an area where the driver performs all of the longitudinal control, the lateral control and the peripheral monitoring of the subject vehicle. The longitudinal direction is a direction that coincides with a front-rear direction of the subject vehicle. The lateral direction is a direction that coincides with a right-left direction of the subject vehicle. The longitudinal direction control corresponds to acceleration-deceleration control of the subject vehicle. The lateral direction control corresponds to steering control of the subject vehicle. For example, the MD area may be an ordinary road. The MD area may be a traveling section of an ordinary road for which high-precision map data is not available.

The AD area is an area where the autonomous driving is permitted. In other words, the AD area is defined as an area where the system of the subject vehicle can substitute for one or more of the longitudinal control, the lateral control, and the periphery monitoring. For example, the AD area may be an expressway. The AD area may be a travel section for which high-precision map data has been prepared. For example, the autonomous driving at area limit LV 3 may be permitted only on an expressway. The autonomous driving at traffic congestion limit LV 3 may be permitted only during the traffic congestion in the AD area.

The AD area is divided into an ST section and a non-ST section. The ST section is a section in which the autonomous driving at the area limit LV 3 (hereinafter referred to as area limit autonomous driving) is permitted. The non-ST section is a section in which the autonomous driving at the LV2 or less and the autonomous driving at the traffic congestion limit LV 3 are possible. In the present embodiment, the non-ST section in which the autonomous driving at the LV 1 is permitted and the non-ST section in which the autonomous driving at the LV 2 is permitted are not divided. The non-ST section may be set to a section that does not correspond to the ST section in the AD area.

The behavior determination unit 102 switches the control subject of driving operation between the driver and the vehicle system of the subject vehicle. The behavior determination unit 102 determines a traveling plan to travel the subject vehicle based on the recognition result of the travel environment by the travel environment recognition unit 101 when the system has a right to control the driving operation.

In addition, the behavior determination unit 102 switches the automation level of autonomous driving of the subject vehicle as necessary. The behavior determination unit 102 determines whether the automation level can be increased. For example, the switching from the autonomous driving at the LV 4 or lower to the autonomous driving at LV 4 or more may be determined to be possible, when the subject vehicle moves from the MD area to the AD area. The behavior determination unit 102 may increase the automation level when it determines that the automation level can be increased and the driver approves the increase in the automation level.

The behavior determination unit 102 may decrease the automation level when determining that the automation level needs to be decreased. Cases where it is determined that the automation level needs to be decreased include the case of override detection, the case of scheduled driving operation exchange, and the case of unscheduled driving operation exchange. The override is an operation for the driver of the subject vehicle to voluntarily acquire the control right of the subject vehicle. In other words, the override is an intervention operation by the driver of the vehicle. Examples of the override operation include a steering operation of the steering wheel, a pressing operation of the accelerator pedal, a pressing operation of the brake pedal, and the like. The scheduled driving operation exchange is a scheduled driving operation exchange according to determination of the system. As an example, when moving from a travel section in an AD area where high-precision map data is available to a travel section in the AD section where high-precision map data is not available, it is determined to switch from the autonomous driving at LV 4 or higher to the autonomous driving at LV 3 or lower. The unscheduled driving operation exchange is an unscheduled sudden driving operation exchange according to the determination of the system.

The behavior determination unit 102 includes a level specifying unit 121, a long-term and middle-term planning unit 122, and a short-term planning unit 123 as sub-functional blocks.

The level specifying unit 101 specifies an automation level of the subject vehicle at the present time. The level specifying unit 121 may specify the present automation level of the subject vehicle based on the switching information on the automation level in the behavior determination unit 102. It may be preferable that the level specifying unit 121 specifies the automation level at LV 3 by distinguishing between the congestion limited LV 3 and the area limited LV 3.

The long-term and middle-term planning unit 122 generates a long-term and middle-term travel plan as a travel plan for travelling the subject vehicle. The long-term and middle-term planning unit 122 specifies and determines a plan route for directing the subject vehicle to a set destination as a long-term and middle-term travel plan. This long-term and middle-term planning unit 122 corresponds to a route specifying unit. The plan route may be a route including a plurality of links. The long-term and middle-term planning unit 122 may specify the plan route in the same manner as the route search of the navigation function. This route search may be performed by cost calculation using Dijkstra's algorithm, for example.

The short-term planning unit 123 generates a short-term travel plan as a travel plan for travelling the subject vehicle. The short-term planning unit 123 uses the virtual space in the periphery of the subject vehicle generated by the travel environment recognition unit 101 to determine a short-term travel plan for realizing the driving operation according to the long-term and middle-term travel plan. Specifically, the short-term planning unit 123 determines the execution of the steering operation for changing lanes, the acceleration/deceleration operation for speed adjustment, the steering and braking operation for avoiding obstacles, and the like.

The short-term planning unit 123 determines to execute the location target speed control based on the fact that the vehicle is traveling at a specific location. The specific location is a location where it is likely to be required for the vehicle to change the vehicle speed due to the structure of the road. The specific location includes a curved road, an interchange (hereinafter referred to as IC), and intersection, and a merge point. Here, each of the curved road, the IC, the intersection, and the merge point includes an entry path. For example, a road section with a curvature equal to or greater than a threshold value may be defined as a curved road. The threshold value may be any value that can be set arbitrarily. The intersection also includes a branch point. The short-term planning unit 123 may determine that the location where the vehicle is traveling is a specific location based on the location where the vehicle is traveling specified by the location specifying unit 111. The location target speed control is the speed control with respect to the location as the target for automatically changing the speed of the subject vehicle. The location target speed control is different from the speed control with respect to an obstacle as a target (hereinafter referred to as obstacle target speed control). Examples of the obstacle target speed control include speed control to maintain a distance from a preceding vehicle and speed control to avoid an obstacle.

The short-term planning unit 123 performs the location target speed control differently depending on whether the subject vehicle is in the autonomous driving operation with monitoring obligation or in the autonomous driving operation with no monitoring obligation. Therefore, it is possible to perform the location target speed control required by the driver depending on whether the subject vehicle is in the autonomous driving operation with monitoring obligation or in the autonomous driving operation with no monitoring obligation. The short-term planning unit 123 may determine that the subject vehicle is in the autonomous driving operation with monitoring obligation when the automation level specified by the level specifying unit 121 is LV 1 or LV 2. The short-term planning unit 123 may determine that the subject vehicle is in the autonomous driving operation with no monitoring obligation when the automation level specified by the level specifying unit 121 is LV 3 or higher.

The short-term planning unit 123 determines the execution of the first speed control as the location target speed control, in which the speed or the speed change is more restricted than a case where the subject vehicle is in the autonomous driving with monitoring obligation, when the subject vehicle is in the autonomous driving with no monitoring obligation. Here, the short-term planning unit 123 may determine the execution of the second speed control as the location target speed control when the subject vehicle is travelling in the specific location and in the autonomous driving with monitoring obligation. The second speed control is the control as the default setting as the location target speed control. In other words, the first speed control is the location target speed control for more restricting the speed than the second speed control.

During the autonomous driving with no monitoring obligation, there is no need for the driver to monitor the periphery. Therefore, it is considered that the speed control for maintaining the operation of the subject vehicle is required more reliably than during the autonomous driving with monitoring obligation. On the other hand, according to the above configuration, by executing the first speed control based on the fact that the subject vehicle is in the autonomous driving with no monitoring obligation, the speed or the speed change is more restricted than a case where the subject vehicle is in the autonomous driving with monitoring obligation. By more restricting the speed or the speed change, it is easier to avoid the obstacle and the like with more margin.

As a result, it is possible to maintain the operation of the subject vehicle more reliably.

When the location where the vehicle is traveling is a specific location where deceleration is likely to be required, the short-term planning unit 123 may determine the execution of the first speed control that automatically decelerates the vehicle as the first speed control. The specific location where deceleration is likely to be required includes the curved road, the IC, and the intersection. The first speed control that automatically decelerates the vehicle includes control for increasing the degree of deceleration larger than the second speed control, control for executing the deceleration more gently than the second speed control, and control for advancing the start timing of the deceleration more quickly than the second speed control. By executing the control for increasing the degree of deceleration larger than the second speed control, it is possible to restrict the vehicle speed to be lower. By executing the control for executing the deceleration more gently than the second speed control, it is possible to restrict the vehicle speed change to be lower. By executing the control for advancing the start timing of the deceleration more quickly than the second speed control, it is possible to restrict the vehicle speed to be lower with the same deceleration, and it is possible to restrict the vehicle speed change to be lower with the same target speed.

When the location where the vehicle is traveling is a specific location where acceleration is likely to be required, the short-term planning unit 123 may determine the execution of the first speed control that automatically accelerates the vehicle as the first speed control. Examples of the specific location where acceleration is likely to be required are a merge point, for example. Examples of the first speed control for automatically accelerating the subject vehicle include control for decreasing the degree of acceleration smaller than the second speed control, and control for executing the acceleration more gently than the second speed control. By executing the control for decreasing the degree of acceleration smaller than the second speed control, it is possible to restrict the vehicle speed to be lower. By executing the control for executing the acceleration more gently than the second speed control, it is possible to restrict the vehicle speed change to be lower.

Here, an example of the relationship between the specific location and the acceleration/deceleration of the first speed control will be explained using FIG. 3. As shown in FIG. 3, when the specific location is a curved road, an IC, or an intersection, deceleration control may be associated as the first speed control. On the other hand, if the specific location is a merge point, acceleration control may be associated as the first speed control. Here, the similar association may be applied to the second speed control and the third speed control described later.

It may be preferable that the short-term planning unit 123 switches whether or not to implement the first speed control according to the driver's state specified by the state specifying unit 104 even if the subject vehicle is in the autonomous driving with no monitoring obligation. Specifically, the short-term planning unit 123 switches whether or not to implement the first speed control, depending on whether the driver's state is a state that the driver is performing the second task or whether the driver's state is a state that the driver is not monitoring the periphery. According to this, it is possible to perform the location target speed control according to the driver's state.

Hereinafter, the state in which the second task is being performed or the state in which the periphery monitoring is not being performed will be referred to as a non-monitoring state. Further, the state in which the second task is not being performed or the state in which the periphery monitoring is being performed will be referred to as a monitoring state.

The short-term planning unit 123 determines to execute the first speed control when the subject vehicle is in the autonomous driving with no monitoring obligation and the driver's state specified by the state specifying unit 104 is a non-monitoring state. On the other hand, the short-term planning unit 123 determines to execute the second speed control when the subject vehicle is in the autonomous driving with no monitoring obligation and the driver's state specified by the state specifying unit 104 is a monitoring state. This is because when the driver is in the monitoring state, there is a high possibility that the driver is executing the periphery monitoring, so it is considered that it may be appropriate to perform the location target speed control similar to that during the autonomous driving with monitoring obligation to monitor the periphery of the vehicle.

It may be preferable that the short-term planning unit 123 executes the first speed control based on the fact that the vehicle is in the autonomous driving with no monitoring obligation other than the traffic jam limited LV 3, while executing the second speed control when the vehicle is in the autonomous driving at the traffic jam limited LV 3. This is because the vehicle speed of the subject vehicle is considered to be maintained at a low speed during the autonomous driving in the traffic jam limited LV 3, and it is considered that the speed can be easily restricted even with the second speed control.

The short-term planning unit 123 may determine to execute the first speed control as the location target speed control when the subject vehicle is in the autonomous driving without sleep permission. On the other hand, it may be preferable that the short-term planning unit 123 determines the execution of the third speed control, which is the location target speed control that more restricts the speed or the speed change than the first speed control, based on the fact that the subject vehicle is in the autonomous driving with sleep permission. The short-term planning unit 123 may determine that the subject vehicle is in the autonomous driving without sleep permission when the automation level specified by the level specifying unit 121 is LV 3. The short-term planning unit 123 may determine that the subject vehicle is in the autonomous driving with sleep permission when the automation level specified by the level specifying unit 121 is LV 4 or higher.

During the autonomous driving with sleep permission, it is required for the system not to take over the driving operation to the driver, even in an emergency. Therefore, even during the autonomous driving with no monitoring obligation, it is considered that the speed control for maintaining the operation of the subject vehicle is required in the autonomous driving with sleep permission more reliably than in the autonomous driving without sleep permission. According to the above configuration, by executing the third speed control when the subject vehicle is in the autonomous driving with sleep permission, it is possible to more restrict the speed or the speed change than in the case of the autonomous driving without sleep permission. As a result, it is possible to maintain the operation of the subject vehicle more reliably. In the case of the autonomous driving with sleep permission, the driver may be in a sleeping state. Therefore, it may be preferable that the third speed control is a control that performs the acceleration and deceleration more gently than the first speed control so as not to disturb the driver's sleep.

The short-term planning unit 123 may decide to execute the third speed control when the subject vehicle is in the autonomous driving without sleep permission and the driver's state specified by the state specifying unit 104 is in a sleeping state. On the other hand, if the subject vehicle is in the autonomous driving without sleep permission and the driver's state specified by the state specifying unit 104 is in an awake state, the short-term planning unit 123 may determine to execute the first speed control. This is because even in the autonomous driving without sleep permission, if the driver is awake, it is considered that there is little need to easily restrict the speed or the speed change up to the third speed control.

The HCU communication unit 103 executes an output process of the information to the HCU 19 and an acquisition process of the information from the HCU 19. The HCU communication unit 103 acquires the estimation result of the state estimation process of the HCU 19.

The state specifying unit 104 specifies the state of the driver of the subject vehicle. The state specifying unit 104 may specify the state of the driver of the subject vehicle from the estimation result obtained by the state estimation process of the HCU 19, which is obtained by the HCU communication unit 103.

When the system of the subject vehicle has a right to control the driving operation, the control execution unit 105 executes the acceleration/deceleration control, the steering control, and the like of the subject vehicle according to the travel plan determined by the behavior determination unit 102, in cooperation with the vehicle control ECU 16. The control execution unit 105 includes a speed control unit 151 as a sub-functional block. The speed control unit 151 executes the location target speed control according to the travel plan determined by the short-term planning unit 123. This process in the speed control unit 151 corresponds to a speed control step.

The control execution unit 105 also executes, for example, ACC (Adaptive Cruise Control) control, LTA (Lane Tracing Assist) control, and LCA (Lane Change Assist) control. The ACC control is the control that provides the subject vehicle to travel at a constant speed that is a set vehicle speed or to travel and follow a preceding vehicle. In the follow-up travel, an acceleration-deacceleration control is performed for maintaining the vehicle-to-vehicle distance between the subject vehicle and the nearest preceding vehicle at a target vehicle-to-vehicle distance. The target vehicle-to-vehicle distance may be set depending on the speed of the subject vehicle. The control for providing the follow-up travel is included in the above-described obstacle target speed control. The LTA control is the control for maintaining the subject vehicle to travel within the lane. In the LTA control, the steering control is executed so as to maintain the subject vehicle to travel within the lane. The LCA control is the control for causing the subject vehicle to automatically change a lane from the lane in which the subject vehicle travels to the adjacent lane. In the LCA control, the lane change is executed by the acceleration-deceleration control and the steering control.

<Speed Control Related Process in Autonomous Driving ECU 10>

Here, an example of the flow of processing related to the location target speed control (hereinafter referred to as a speed control related process) in the autonomous driving ECU 10 will be described using the flowchart of FIG. 4. The flowchart of FIG. 4 may be configured to be started, for example, when the subject vehicle starts the autonomous driving operation. In other words, it may be configured to start when the automation level of the subject vehicle is LV 1 or higher. Here, the flowchart in FIG. 4 may be configured to be started when the automation level of the subject vehicle is LV 2 or higher.

First, in step S1, if the travel location of the subject vehicle specified by the location specifying unit 111 is a specific location ("YES" in S1), the process proceeds to step S2. On the other hand, if the travel location where the subject vehicle is traveling is not the specific location ("NO" in S1), the process proceeds to step S10.

In step S2, if the automation level of the subject vehicle specified by the level specifying unit 121 is LV 3 or higher ("YES" in S2), the process proceeds to step S4. On the other hand, if the automation level is between LV 1 and LV 2 ("NO" in S2), the process proceeds to step S3.

In step S3, the short-term planning unit 123 determines to execute the second speed control as the location target speed control. Then, the control execution unit 105 executes the second speed control, and the process proceeds to step S10. The second speed control may be performed in accordance with the specific location specified in S1. If the specific location is a curved road, an IC, or an intersection, the second speed control that automatically decelerates the vehicle may be performed. On the other hand, if the specific location is a merging point, the second speed control may be performed to automatically accelerate the subject vehicle. The same feature may be applied to the first speed control and the third speed control, which will be described later.

In step S4, if the automation level of the subject vehicle specified by the level specifying unit 121 is the traffic congestion limited LV 3 ("YES" in S4), the process proceeds to S3. On the other hand, if the automation level is not the traffic congestion limited LV 3 ("NO" in S4), the process proceeds to step S5.

In step S5, if the automation level of the subject vehicle specified by the level specifying unit 121 is LV 4 or higher ("YES" in S5), the process proceeds to step S8. On the other hand, when the automation level of the subject vehicle is determined to be lower than LV 4 ("NO" in S5), the process proceeds to step S6.

In step S6, if the driver's state specified by the state specifying unit 104 is the monitoring state ("YES" in S6), the process proceeds to S3. On the other hand, if the driver's state is the non-monitoring state ("NO" in S6), the process proceeds to step S7.

In step S7, the short-term planning unit 123 determines to execute the first speed control as the location target speed control. Then, the control execution unit 105 executes the first speed control, and the process proceeds to step S10.

In step S8, if the driver's state specified by the state specifying unit 104 is a sleep state ("YES" in S8), the process proceeds to step S9. On the other hand, if the driver's state is not the sleep state ("NO" in S8), the process proceeds to step S7.

In step S9, the short-term planning unit 123 determines to execute the third speed control as the location target speed control. Then, the control execution unit 105 executes the third speed control, and the process proceeds to step S10.

In S10, when it is the end timing of the speed control-related process ("YES" in S10), the speed control-related process ends. On the other hand, when it is yet not the end timing of the speed control-related process ("NO" in S10), the process returns to S1 and repeats the process. Examples of the end timing of the speed control related process include when the power switch of the subject vehicle is turned off, when the automation level of the subject vehicle becomes LV 0, and the like.

Figure 4:
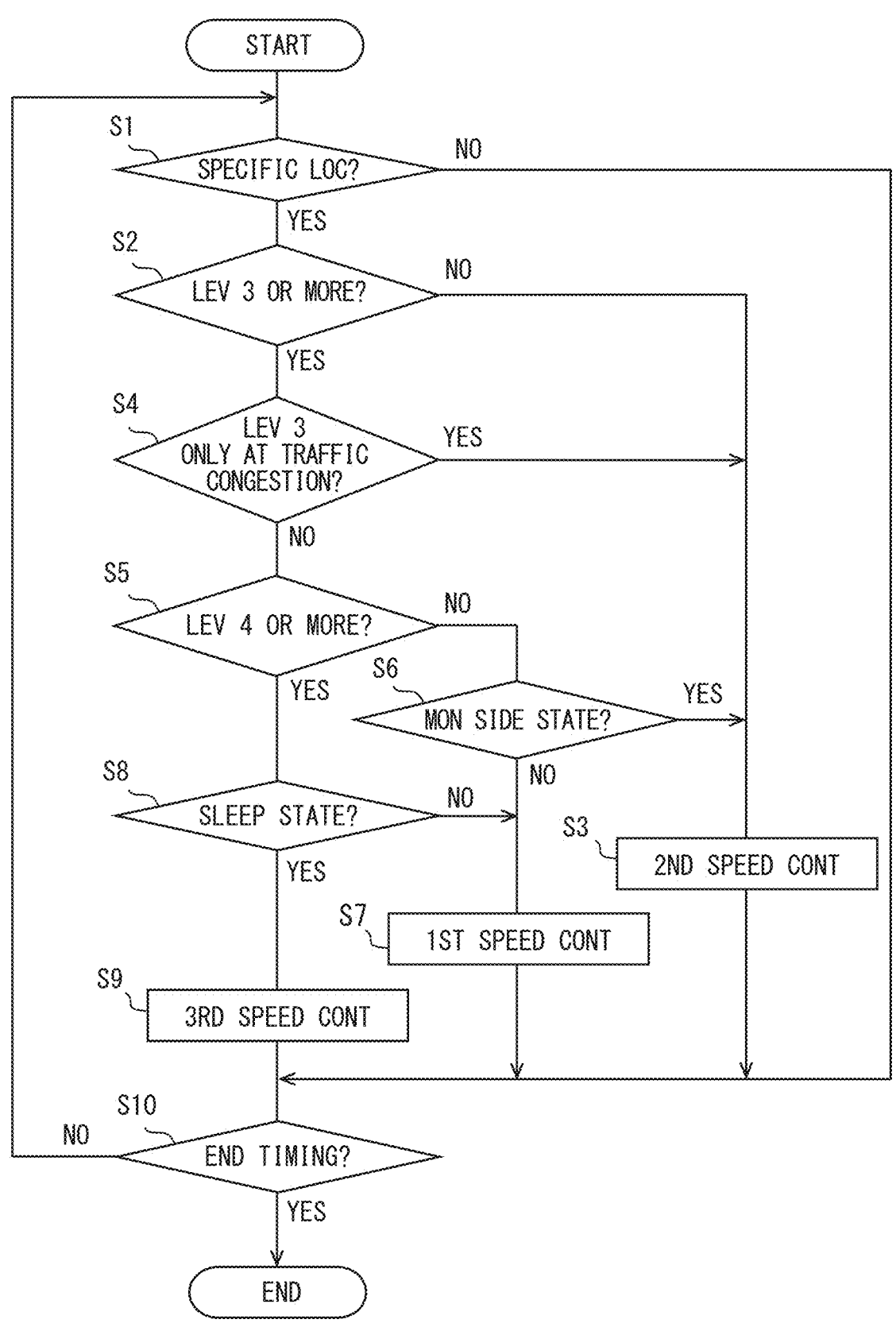
FIG. 4 is a flowchart showing an example of the flow of a speed control related process in the autonomous driving ECU according to the first embodiment.

In the flowchart of FIG. 4, the process of S4 may be omitted. In this case, the configuration may be such that when the determination is "YES" in S2, the process shifts to S5. In the flowchart of FIG. 4, the process of S8 may be omitted. In this case, the configuration may be such that when the determination is "YES" in S5, the process shifts to S9. In the flowchart of FIG. 4, the processes of S5 and S8 to S9 may be omitted. In this case, the configuration may be such that when the determination is "NO" in S4, the process shifts to S6. In the flowchart of FIG. 4, the processes of S4 to S5 and S8 to S9 may be omitted. In this case, the configuration may be such that when the determination is "YES" in S2, the process shifts to S6. In the flowchart of FIG. 4, the process of S6 may be omitted. In this case, a configuration may be such that when the process in S7 is performed instead of the process in S6.

According to the configuration of the first embodiment, it is possible to perform the location target speed control required by the driver, depending on whether the vehicle is in the autonomous driving with monitoring obligation or the autonomous driving with no monitoring obligation. As a result, it is possible to suppress a reduction in convenience for the driver when performing the speed control of the vehicle during the autonomous driving with no monitoring obligation.

Second Embodiment

In the first embodiment, a configuration is described in which the short-term planning unit 123 determines to execute the second speed control as the location target speed control when the subject vehicle is in the autonomous driving at the traffic congestion limited LV 3, but the feature is not necessarily limited to this case. The configuration of the following second embodiment may be applied. The second embodiment is the same as the first embodiment except that the short-term planning unit 123 determines not to perform the location target speed control when the subject vehicle is in the autonomous driving at the traffic congestion limited LV 3.

Figure 5:
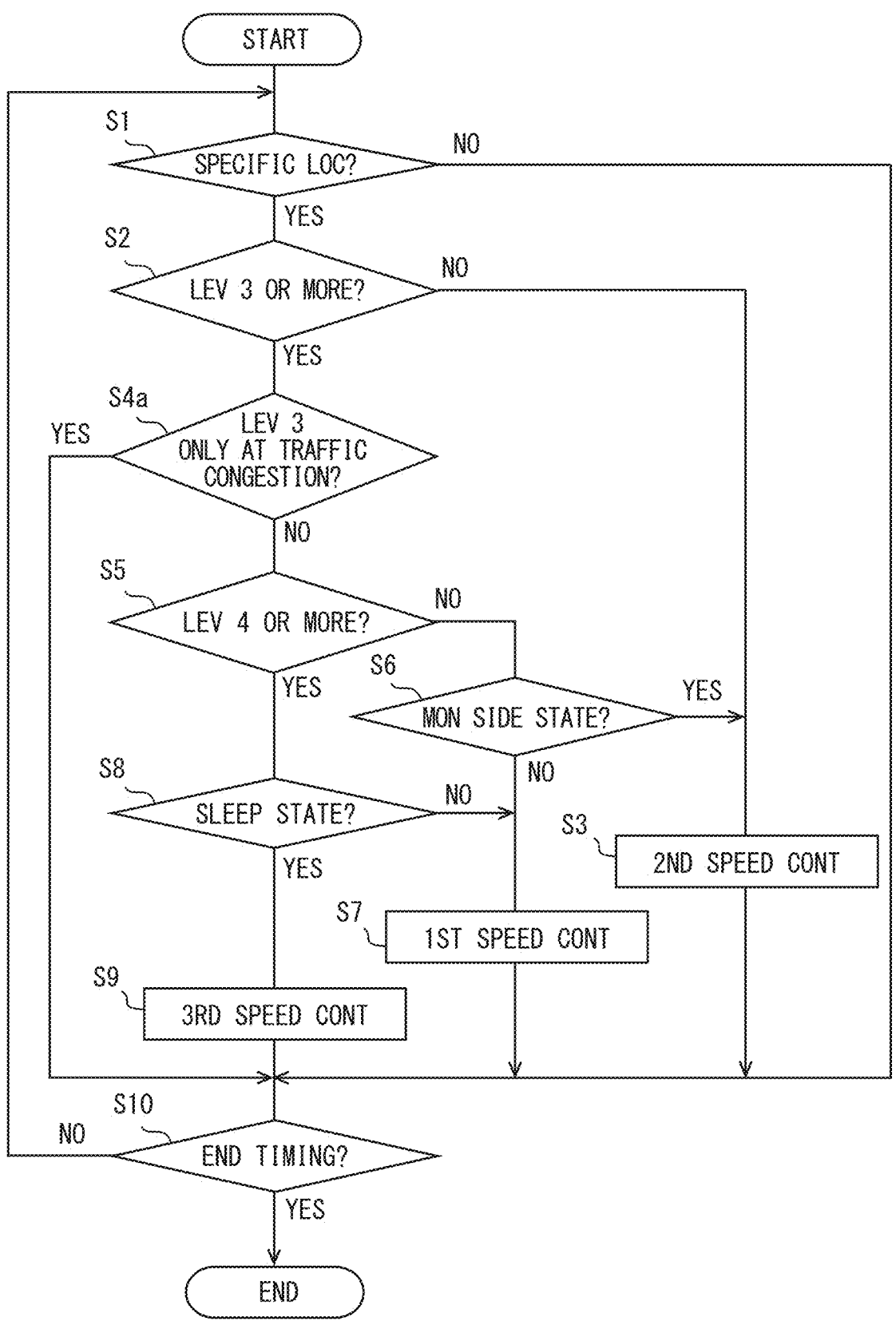
FIG. 5 is a flowchart showing an example of the flow of a speed control related process in the autonomous driving ECU according to the second embodiment.

Here, an example of the flow of the speed control related process in the autonomous driving ECU 10 in the second embodiment will be described using the flowchart in FIG. 5. The flowchart in FIG. 5 may be the same as the flowchart in FIG. 4 of the first embodiment, except that the process in step S4*a* is performed instead of the process in S4.

In step S4*s*, if the automation level of the subject vehicle specified by the level specifying unit 121 is the traffic congestion limited LV 3 ("YES" in S4*s*), the process proceeds to S10. On the other hand, if the automation level of the subject vehicle is not the traffic congestion limited LV 3 ("NO" in S4*a*), the process proceeds to S5. As a result, the control execution unit 105 does not perform the location target speed control when the subject vehicle is in the autonomous driving at traffic congestion limited LV 3. According to the configuration of the second embodiment, it is possible to restrict the unnecessary operation of performing the location target speed control during the autonomous driving at the traffic congestion limited LV 3, where the possibility that the vehicle speed of the subject vehicle is maintained at a low speed is high.

Third Embodiment

The present embodiments are not limited to the above-described embodiment, and may be configured as in the third embodiment below. The following feature will be described as an example of a configuration of the third embodiment with reference to the accompanying drawings. A vehicle system 1 of the third embodiment is similar to the vehicle system 1 of the first embodiment, except that the vehicle system 1 includes an autonomous driving ECU 10*b* instead of the autonomous driving ECU 10.

<Schematic Configuration of Autonomous Driving ECU 10*b*>

Figure 6:
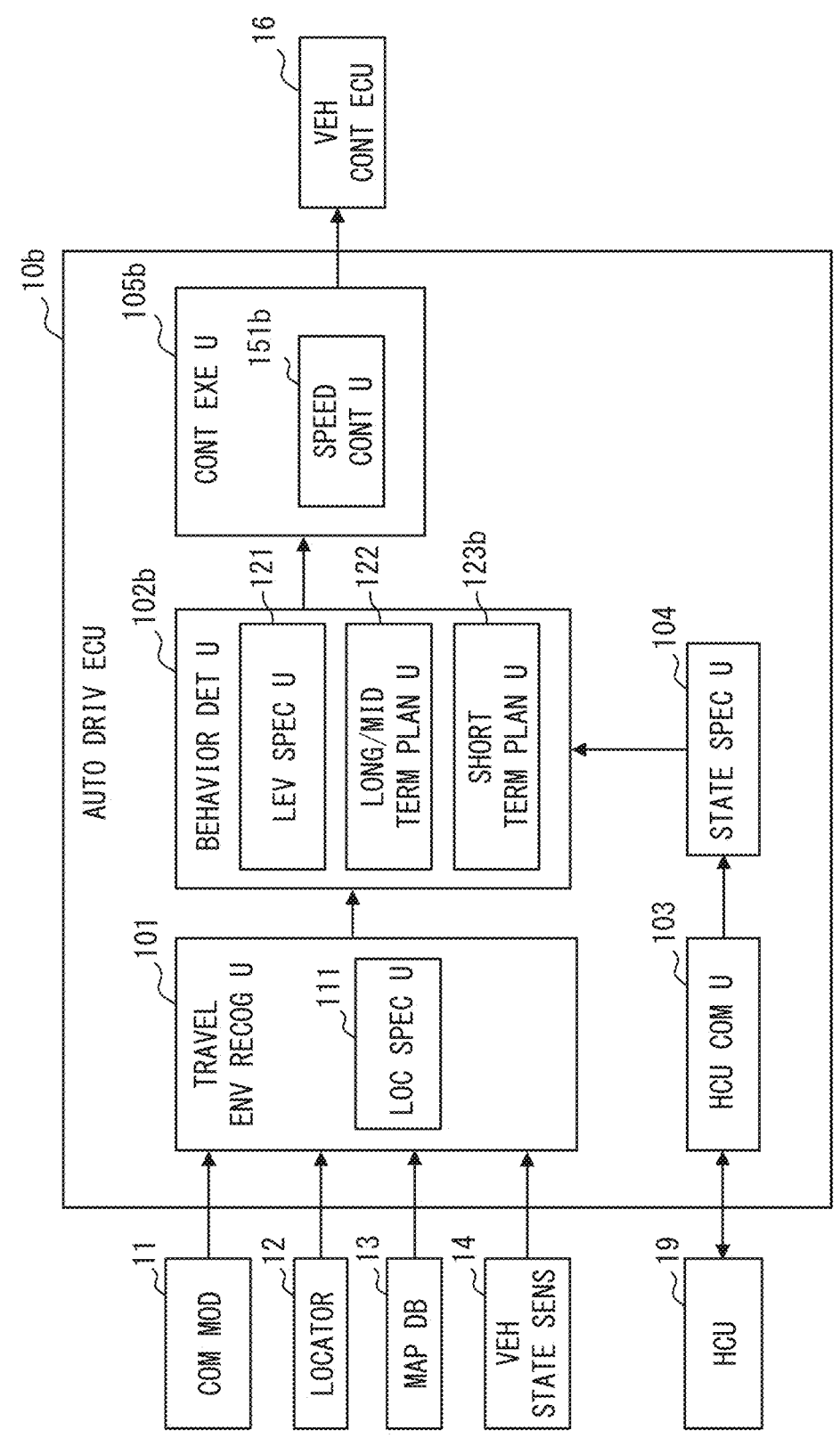
FIG. 6 is a diagram illustrating an example of a schematic configuration of an automatic driving ECU.

Here, the schematic configuration of the autonomous driving ECU 10*b* will be described using FIG. 6. As shown in FIG. 6, the autonomous driving ECU 10*b* includes a travel environment recognition unit 101, a behavior determination unit 102*b*, an HCU communication unit 103, a state specifying unit 104, and a control execution unit 105*b* as functional blocks. The autonomous driving ECU 10*b* is the same as the autonomous driving ECU 10 of the first embodiment, except that the autonomous driving ECU 10*b* includes a behavior determination unit 102*b* and a control execution unit 105*b* instead of the behavior determination unit 102 and the control execution unit 105. The autonomous driving ECU 10*b* also corresponds to the vehicle control device. The execution of the processes of the functional blocks of the autonomous driving ECU 10*b* by the computer corresponds to execution of a vehicle control method.

The behavior determination unit 102*b* includes a level specifying unit 121, a long-term and middle-term planning unit 122, and a short-term planning unit 123*b* as sub-functional blocks. The behavior determination unit 102*b* is the same as the behavior determination unit 102 of the first embodiment, except that the behavior determination unit 102*b* includes a short-term planning unit 123*b* instead of the short-term planning unit 123. The control execution unit 105*b* includes a speed control unit 151*b* as a sub-functional block. The control execution unit 105*b* is the same as the control execution unit 105 of the first embodiment except that the control execution unit 105*b* includes a speed control unit 151*b* instead of the speed control unit 151.

The short-term planning unit 123*b* is the same as the short-term planning unit 123 of the first embodiment, except that the processing related to the determination of executing the location target speed control is different. The speed control unit 151*b* is similar to the speed control unit 151 of the first embodiment, except that the speed control unit 151*b* executes the location target speed control according to the travel plan determined by the short-term planning unit 123*b*. The process in the speed control unit 151*b* also corresponds to a speed control process.

Even if the short-term planning unit 123*b* does not determine to execute the location target speed control during the autonomous driving with monitoring obligation, the short-term planning unit 123*b* does not determine to execute the location target speed control during the autonomous driving with no monitoring obligation In other words, under a road condition that the short-term planning unit 123*b* does not determine to execute the location target speed control during the autonomous driving with monitoring obligation, the short-term planning unit 123*b* does not determine to execute the location target speed control during the autonomous driving with no monitoring obligation.

The short-term planning unit 123*b* may not determine to execute the control for decelerating the subject vehicle as the location target speed control (hereinafter referred to as location target deceleration control) when the travel location where the subject vehicle is traveling, which is specified by the location specifying unit 111, is a curved road with a magnitude of the curve equal to or greater than a specific value (hereinafter referred to as a target curved road), and the subject vehicle is in the autonomous driving with monitoring obligation. The magnitude of the curve may be expressed as, for example, a curvature. The specific value described here may be a value that can be arbitrarily set. Here, even if the location target deceleration control is not performed, the obstacle target speed control may be performed. On the other hand, if the travel location of the subject vehicle specified by the location specifying unit 111 is a target curved road and the subject vehicle is in the autonomous driving with no monitoring obligation, the short-term planning unit 123*b* may determine to execute the location target deceleration control. Further, on a curved road where the magnitude of the curve is less than a specific value, it may be configured that the location target deceleration control is not be executed during the autonomous driving with monitoring obligation or the autonomous driving with no monitoring obligation.

According to this, even if the vehicle does not decelerate during the autonomous driving with monitoring obligation on a curved road with a large curvature, it is possible to decelerate during the autonomous driving with no monitoring obligation. It is considered that the speed control for maintaining the operation of the subject vehicle more reliably is required during the autonomous driving with no monitoring obligation than during the autonomous driving with monitoring obligation. On the other hand, according to the above configuration, even on a curved road where the subject vehicle does not decelerate during the autonomous driving with monitoring obligation, the vehicle decelerate during the autonomous driving with no monitoring obligation, so that it is possible to maintain the operation of the subject vehicle more reliably.

The short-term planning unit 123*b* may not determine to execute the location target deceleration control when the travel location of the vehicle specified by the location specifying unit 111 is an intersection and the subject vehicle is in the autonomous driving with monitoring obligation. On the other hand, based on the fact that the travel location of the subject vehicle specified by the location specifying unit 111 is an intersection, it may be determined to execute the location target deceleration control while the subject vehicle is in the autonomous driving with no monitoring obligation.

According to this, even if the vehicle does not decelerate at an intersection during the autonomous driving with monitoring obligation, it is possible to decelerate during the autonomous driving with no monitoring obligation. It is considered that the speed control for maintaining the operation of the subject vehicle more reliably is required during the autonomous driving with no monitoring obligation than during the autonomous driving with monitoring obligation. On the other hand, according to the above configuration, even at an intersection where the subject vehicle does not decelerate during the autonomous driving with monitoring obligation, the vehicle decelerate during the autonomous driving with no monitoring obligation, so that it is possible to maintain the operation of the subject vehicle more reliably.

The short-term planning unit 123*b* determines to execute the location target deceleration control when the travel location of the subject vehicle specified by the location specifying unit 111 is an intersection where the subject vehicle is planned to turn left or right on the planned route specified by the long-term and middle-term planning unit 122, and the subject vehicle is in the autonomous driving with no monitoring obligation. On the other hand, the short-term planning unit 123*b* may not determine to execute the location target deceleration control when the travel location of the subject vehicle specified by the location specifying unit 111 is an intersection where the subject vehicle is planned to go straight on the planned route specified by the long-term and middle-term planning unit 122, and the subject vehicle is in the autonomous driving with no monitoring obligation. At the intersection where the subject vehicle is planned to go straight, there is little need to decelerate if there are no obstacles. On the other hand, according to the above configuration, at an intersection where the subject vehicle is planned to go straight, even if the subject vehicle is in the autonomous driving with no monitoring obligation, it is possible to restrict unnecessary control by not executing the location target deceleration control.

The short-term planning unit 123*b* may not determine to execute the location target deceleration control when the travel location of the vehicle specified by the location specifying unit 111 is an IC and the subject vehicle is in the autonomous driving with monitoring obligation. On the other hand, the short-term planning unit 123*b* may determine to execute the location target deceleration control when the travel location of the vehicle specified by the location specifying unit 111 is an IC and the subject vehicle is in the autonomous driving with no monitoring obligation.

According to this, even if the vehicle does not decelerate at an IC during the autonomous driving with monitoring obligation, it is possible to decelerate during the autonomous driving with no monitoring obligation. According to the above configuration, even at an IC where the subject vehicle does not decelerate during the autonomous driving with monitoring obligation, the vehicle decelerate during the autonomous driving with no monitoring obligation, so that it is possible to maintain the operation of the subject vehicle more reliably.

The short-term planning unit 123*b* may not determine to execute a control for restricting the acceleration as the location target speed control (i.e., location target acceleration restriction control) when the travel location of the vehicle specified by the location specifying unit 111 is a merge point and the subject vehicle is in the autonomous driving with monitoring obligation. Here, even if the location target acceleration restriction control is not performed, the obstacle target speed control may be performed. On the other hand, if the travel location of the subject vehicle specified by the location specifying unit 111 is a merge point and the subject vehicle is in the autonomous driving with no monitoring obligation, the short-term planning unit 123*b* may determine to execute the location target acceleration restriction control.

According to the above configuration, even if the acceleration is not restricted during the autonomous driving with monitoring obligation at the merge point, it is possible to restrict the acceleration during the autonomous driving with no monitoring obligation. Here, the feature for not restricting the acceleration may indicate that the restriction for setting a certain upper limit or the restriction for reducing the acceleration is not executed with respect to the acceleration operation required by the system of the subject vehicle at the merge point. According to the above configuration, even at a merge point where the acceleration is not restricted during the autonomous driving with monitoring obligation, the acceleration is restricted during the autonomous driving with no monitoring obligation, so that it is possible to maintain the operation of the subject vehicle more reliably.

Figures 7, 8:
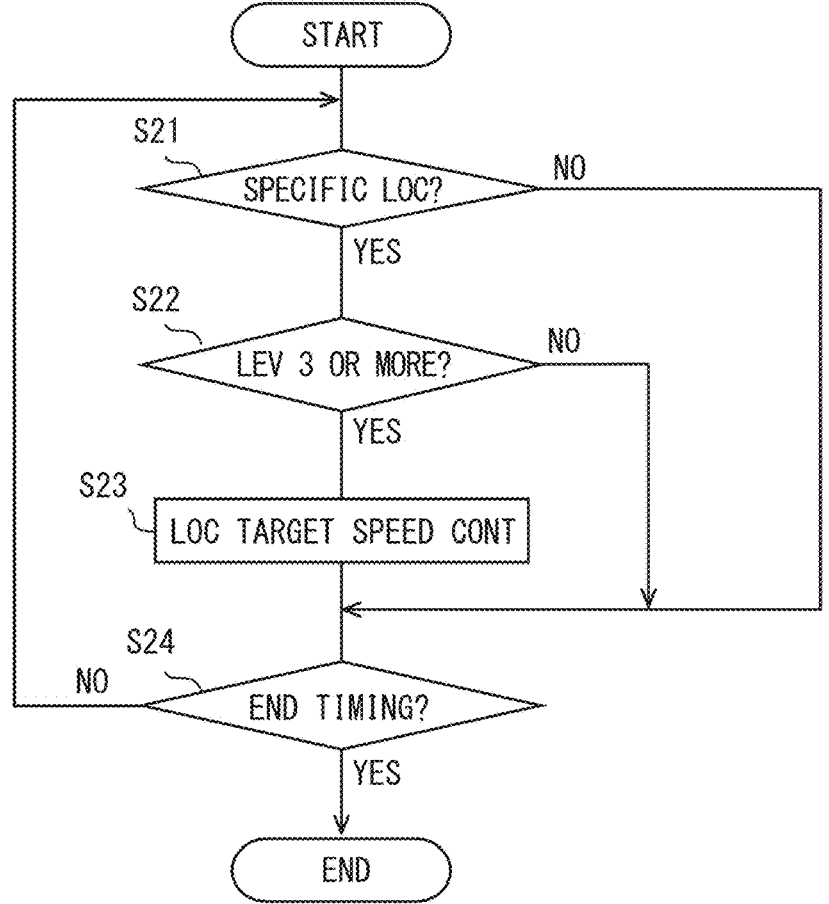
FIG. 7 is a diagram illustrating an example of the relationship between the travelling location of the subject vehicle and location target speed control depending on whether there is a monitoring obligation.
FIG. 8 is a flowchart showing an example of the flow of a speed control related process in the autonomous driving ECU according to the third embodiment.

Here, with reference to FIG. 7, an example of the relationship between the travel location of the subject vehicle and the location target speed control based on whether or not there is a monitoring obligation will be summarized. As shown in FIG. 7, when the travel location of the subject vehicle is a target curved road, an IC, or an intersection where the subject vehicle is planned to turn right or left, and the subject vehicle is in the autonomous driving with no monitoring obligation, the location target deceleration control is performed. On the other hand, even if the travel location of the subject vehicle is a curved road, an IC, or an intersection where the subject vehicle is planned to turn right or left, the location target speed control is not executed during the autonomous driving with monitoring obligation. If the travel location of the subject vehicle is an intersection where the subject vehicle is planned to go straight, the location target speed control is not executed, regardless of whether the subject vehicle is in the autonomous driving with monitoring obligation or in the autonomous driving with no monitoring obligation. When the travel location of the subject vehicle is a merging point and during the autonomous driving with no monitoring obligation, the location target acceleration restriction control is executed. On the other hand, even if the travel location of the subject vehicle is a merging point and during the autonomous driving with monitoring obligation, the location target speed control is not executed.

<Speed Control Related Process in Autonomous Driving ECU 10b>

Here, an example of the flow of speed control related process in the autonomous driving ECU 10b will be described using the flowchart in FIG. 8. The flowchart of FIG. 8 may be configured to be started under a condition that is similar to the condition of the flowchart of FIG. 4.

First, in step S21, if the travel location of the subject vehicle specified by the location specifying unit 111 is a specific location ("YES" in S21), the process proceeds to step S22. The specific location described here includes a target curved roads, an IC, an intersection where right or right turn is planned, and a merge point. On the other hand, if the travel location where the subject vehicle is traveling is not the specific location ("NO" in S21), the process proceeds to step S24.

In step S22, if the automation level of the subject vehicle specified by the level specifying unit 121 is LV 3 or higher ("YES" in S22), the process proceeds to step S23. On the other hand, if the automation level is between LV 1 and LV 2 ("NO" in S22), the process proceeds to step S24.

In step S23, the short-term planning unit 123b determines to execute the location target speed control. Then, the control execution unit 105b executes the location target speed control, and the process proceeds to step S24. The location target speed control may be performed in accordance with the specific location specified in S21. If the specific location is a curved road, an IC, or an intersection where a right or left turn is planned, the location target deceleration control may be performed. On the other hand, if the specific location is a merge point, the location target acceleration restriction control may be executed.

In S24, when it is the end timing of the speed control-related process ("YES" in S24), the speed control-related process ends. On the other hand, when it is yet not the end timing of the speed control-related process ("NO" in S24), the process returns to S21 and repeats the process.

According to the configuration of the third embodiment, it is possible to determine whether the location target speed control is executed when the location where the subject vehicle is travelling is a specific location where a speed change of the vehicle is required according to the structure of the road, differently depending on whether the subject vehicle is in the autonomous driving with monitoring obligation or in the autonomous driving with no monitoring obligation. Therefore, it is possible to perform the location target speed control required by the driver depending on whether the vehicle is in the autonomous driving operation with monitoring obligation or in the autonomous driving operation with no monitoring obligation. As a result, it is possible to suppress a reduction in convenience for the driver when performing the speed control of the vehicle during the autonomous driving with no monitoring obligation.

Fourth Embodiment

The present embodiments are not limited to the above-described embodiment, and may be configured as in the fourth embodiment below. The following will describe a detailed example of the fourth embodiment with reference to the accompanying drawings. A vehicle system 1 of the fourth embodiment is similar to the vehicle system 1 of the first embodiment, except that the vehicle system 1 includes an autonomous driving ECU 10c instead of the autonomous driving ECU 10.

<Schematic Configuration of Autonomous Driving ECU 10c>

Figure 9:
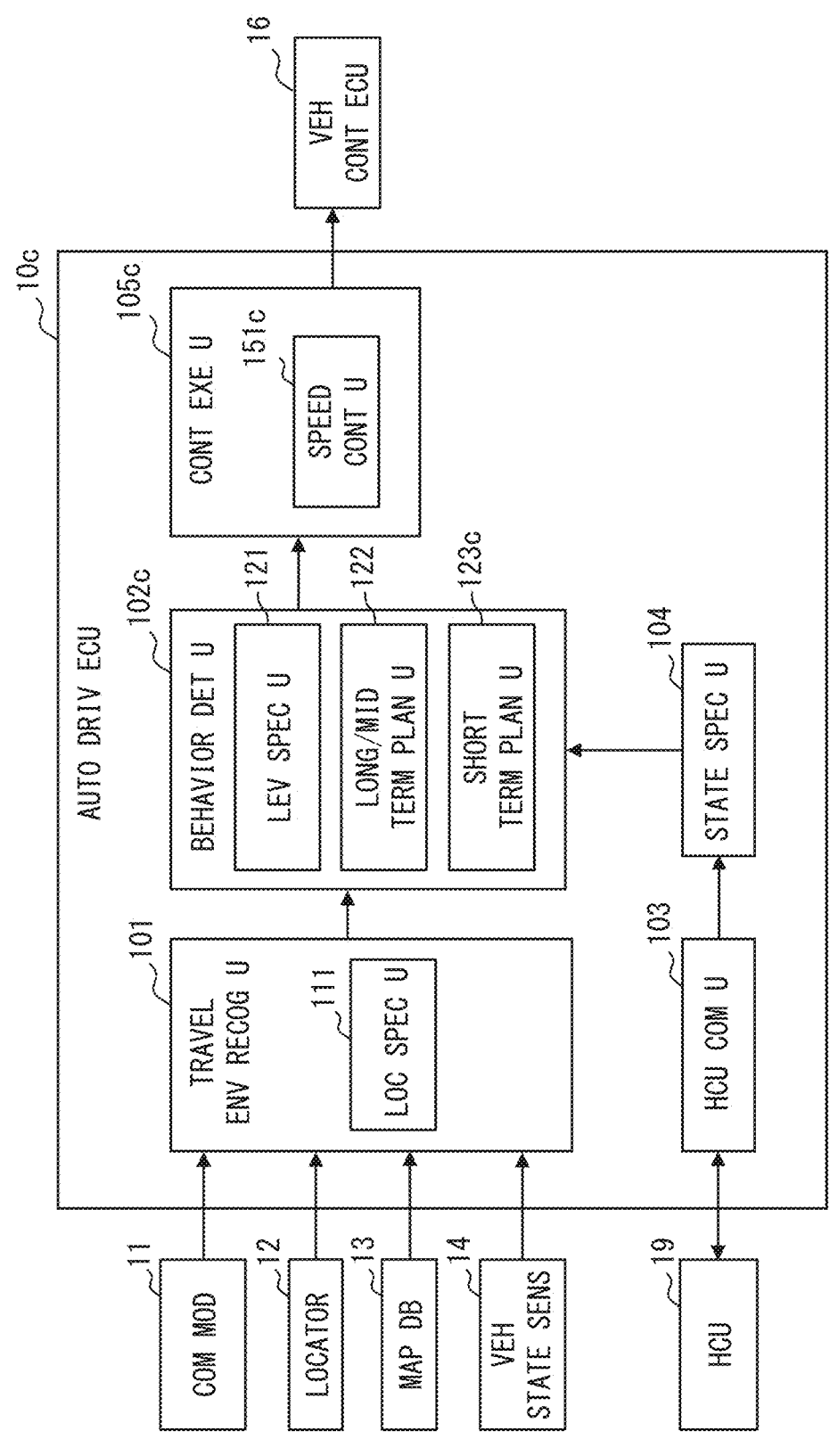
FIG. 9 is a diagram illustrating an example of a schematic configuration of an automatic driving ECU.

Here, the schematic configuration of the autonomous driving ECU 10c will be described using FIG. 9. As shown in FIG. 9, the autonomous driving ECU 10c includes a travel environment recognition unit 101, a behavior determination unit 102c, an HCU communication unit 103, a state specifying unit 104, and a control execution unit 105c as functional blocks. The autonomous driving ECU 10c is the same as the autonomous driving ECU 10 of the first embodiment, except that the autonomous driving ECU 10c includes a behavior determination unit 102c and a control execution unit 105c instead of the behavior determination unit 102 and the control execution unit 105. The autonomous driving ECU 10c also corresponds to the vehicle control device. The execution of the processes of the functional blocks of the autonomous driving ECU 10c by the computer corresponds to execution of a vehicle control method.

The behavior determination unit 102c includes a level specifying unit 121, a long-term and middle-term planning unit 122, and a short-term planning unit 123c as sub-functional blocks. The behavior determination unit 102c is the same as the behavior determination unit 102 of the first embodiment, except that the behavior determination unit 102c includes a short-term planning unit 123c instead of the short-term planning unit 123. The control execution unit 105c includes a speed control unit 151c as a sub-functional block. The control execution unit 105c is the same as the control execution unit 105 of the first embodiment except that the control execution unit 105c includes a speed control unit 151c instead of the speed control unit 151. The process in the speed control unit 151c also corresponds to a speed control process.

The short-term planning unit 123c is the same as the short-term planning unit 123 of the first embodiment, except that the processing related to the determination of executing the location target speed control is different. The speed control unit 151c is similar to the speed control unit 151 of the first embodiment, except that the speed control unit 151c executes the location target speed control according to the travel plan determined by the short-term planning unit 123c.

The short-term planning unit 123c determines to execute the fourth speed control as the location target speed control for maintaining a speed more stably when the travel location of the subject vehicle is a specific location and the subject vehicle is in the autonomous driving with no monitoring obligation than a case where the subject vehicle is in the autonomous driving with monitoring obligation. Here, the short-term planning unit 123c may determine the execution of the second speed control as the location target speed control when the subject vehicle is travelling in the specific location and in the autonomous driving with monitoring obligation. In other words, the fourth speed control is the location target speed control for more maintaining the speed more stably than the second speed control.

During the autonomous driving with no monitoring obligation, there is no need for the driver to monitor the periphery. Therefore, during the autonomous driving with no monitoring obligation, there are many situations in which the driver does not monitor an area in front of the subject vehicle. If the driver does not monitor the area in front of the subject vehicle, the driver may be less likely to notice even if the degree of deceleration at a specific location is reduced, and therefore, the driver may not feel uneasy. On the other hand, by maintaining the speed more stably, it is possible to restrict unnecessary consumption of the travel energy of the subject vehicle. Therefore, according to the configuration of fourth embodiment, it is possible to restrict unnecessary consumption of the travel energy of the subject vehicle while suppressing the driver's anxiety.

The short-term planning unit 123c may determine to execute the fourth speed control as described below when the travel location of the subject vehicle is a specific location where the deceleration is likely to be required. The specific location where deceleration is likely to be required includes the curved road, the IC, and the intersection. Examples of the fourth speed control include control for reducing the degree of deceleration smaller than the second speed control, and control without executing the deceleration. By executing control for reducing the degree of deceleration smaller than the second speed control, it becomes more stably to maintain the speed. If the control without executing the deceleration is executed, the speed can be maintained. Here, the control without executing the deceleration indicates the control not executing the deceleration as the fourth speed control which is the location target speed control. Even if the deceleration is not executed by the fourth speed control, there may be cases where the deceleration is executed by the obstacle target speed control.

The short-term planning unit 123c may determine to execute the fourth speed control as described below when the travel location of the subject vehicle is a specific location where the acceleration is likely to be required. Examples of the specific location where acceleration is likely to be required are a merge point, for example. Examples of the fourth speed control that automatically accelerates the subject vehicle include control for reducing the degree of acceleration smaller than the second speed control, and control without executing the acceleration. By executing control for reducing the degree of acceleration smaller than the second speed control, it becomes more stably to maintain the speed. If the control without executing the acceleration is executed, the speed can be maintained.

It may be preferable that the short-term planning unit 123c switches whether or not to execute the fourth speed control according to the driver's state specified by the state specifying unit 104 even if the subject vehicle is in the autonomous driving with no monitoring obligation. Specifically, the short-term planning unit 123c switches whether to execute the fourth speed control, depending on whether or not the driver's state is not a state for monitoring the periphery of the subject vehicle. According to this, it is possible to perform the location target speed control according to the driver's state.

The short-term planning unit 123c may determine to execute the fourth speed control when the subject vehicle is in the autonomous driving with no monitoring obligation and the driver's state specified by the state specifying unit 104 is a state in which the driver does not monitor the situation in the periphery of the subject vehicle. On the other hand, when the subject vehicle is in the autonomous driving with no monitoring obligation and the driver's state specified by the state specifying unit 104 is a state in which the driver monitors the situation in the periphery of the subject vehicle, the short-term planning unit 123c may determine to execute the second speed control. This is because if the fourth speed control for maintaining the speed more stably in a case where the driver monitors the situation of the periphery, the driver may feel uneasy.

<Speed Control Related Process in Autonomous Driving ECU 10c>

Here, an example of the flow of speed control related process in the autonomous driving ECU 10c will be described using the flowchart in FIG. 10. The flowchart of FIG. 10 may be configured to be started under a condition that is similar to the condition of the flowchart of FIG. 4.

First, in step S41, if the travel location of the subject vehicle specified by the location specifying unit 111 is a specific location ("YES" in S41), the process proceeds to step S42. On the other hand, if the travel location where the subject vehicle is traveling is not the specific location ("NO" in S41), the process proceeds to step S46.

In step S42, if the automation level of the subject vehicle specified by the level specifying unit 121 is LV 3 or higher ("YES" in S42), the process proceeds to step S44. On the other hand, if the automation level is between LV 1 and LV 2 ("NO" in S42), the process proceeds to step S43.

In step S43, the short-term planning unit 123 determines to execute the second speed control as the location target speed control. Then, the control execution unit 105c executes the second speed control, and the process proceeds to step S46. As the second speed control, control similar to that described in the explanation of S3 may be executed.

In step S44, if the state of the driver specified by the state specifying unit 104 is a state in which the driver does not monitor the situation of the periphery ("NO" in S44), the process proceeds to S45. On the other hand, if the state of the driver is a state in which the driver monitors the situation of the periphery ("YES" in S44), the process proceeds to S43.

In step S45, the short-term planning unit 123 determines to execute the fourth speed control as the location target speed control. Then, the control execution unit 105c executes the fourth speed control, and the process proceeds to step S46. The fourth speed control may be performed in accordance with the specific location specified in S41. When the specific location is a curved road, an IC, or an intersection, the fourth speed control that reduces the degree of deceleration or the fourth speed control that does not execute the deceleration may be executed. On the other hand, if the specific location is a merge point, the fourth speed control that reduces the degree of acceleration or the fourth speed control that does not execute the acceleration may be executed.

In S46, when it is the end timing of the speed control-related process ("YES" in S46), the speed control-related process ends. On the other hand, when it is yet not the end timing of the speed control-related process ("NO" in S46), the process returns to S41 and repeats the process.

In the flowchart of FIG. 10, the process of S44 may be omitted. In this case, the configuration may be such that when the determination is "YES" in S42, the process shifts to S45.

Fifth Embodiment

The present embodiments are not limited to the above-described embodiment, and may be configured as in the fifth embodiment below. The following will describe a detailed example of the fifth embodiment with reference to the accompanying drawings. A vehicle system 1 of the fifth embodiment is similar to the vehicle system 1 of the third embodiment, except that the vehicle system 1 includes an autonomous driving ECU 10*d* instead of the autonomous driving ECU 10*b*.

<Schematic Configuration of Autonomous Driving ECU 10*d*>

Figure 11:
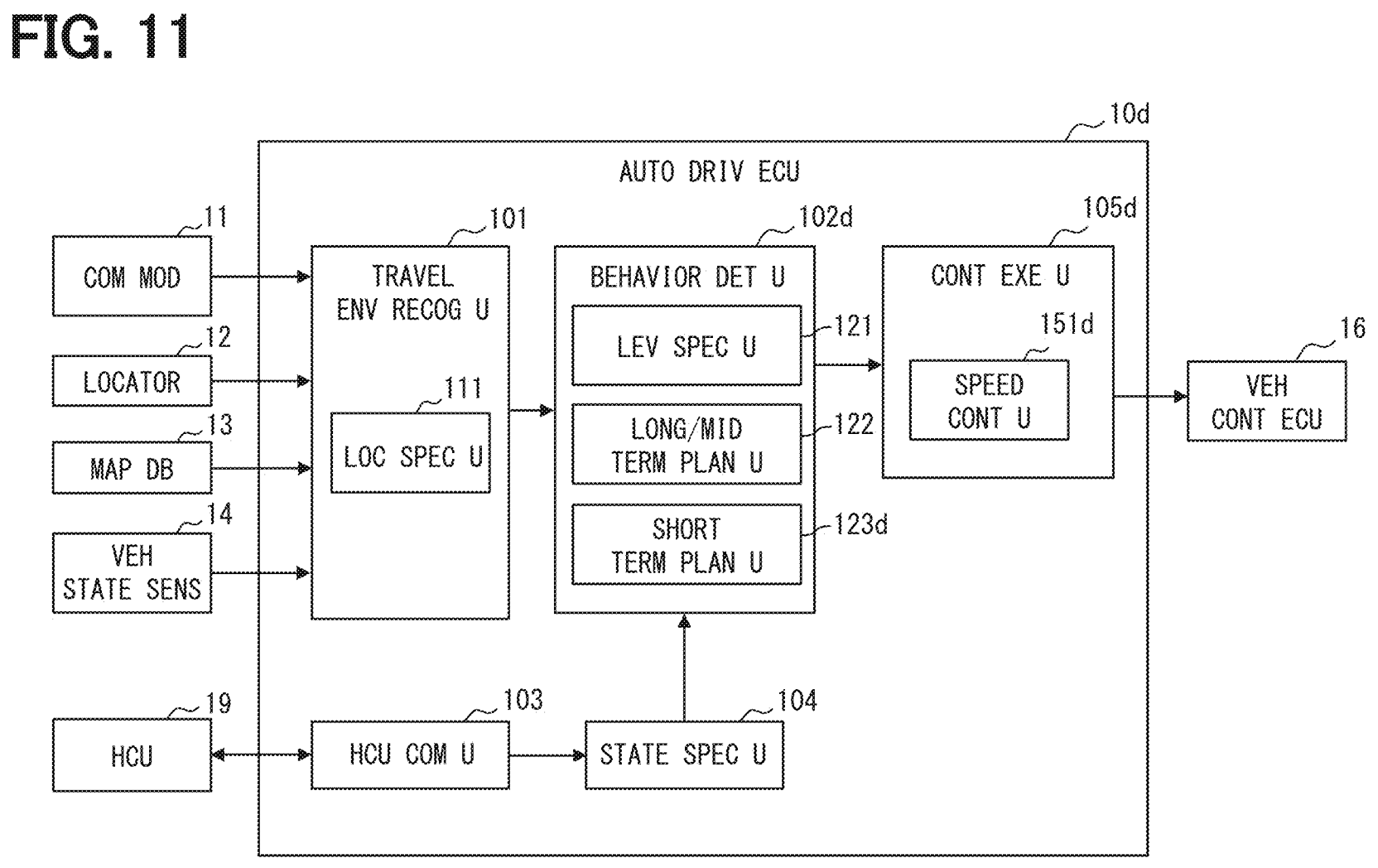

Here, the schematic configuration of the autonomous driving ECU 10*d* will be described using FIG. 11. As shown in FIG. 11, the autonomous driving ECU 10*d* includes a travel environment recognition unit 101, a behavior determination unit 102*d*, an HCU communication unit 103, a state specifying unit 104, and a control execution unit 105*d* as functional blocks. The autonomous driving ECU 10*d* includes a behavior determination unit 102*d* instead of the behavior determination unit 102*b*. The autonomous driving ECU 10*d* includes a control execution unit 105*d* instead of the control execution unit 105*b*. Except for these points, the autonomous driving ECU 10*d* is the same as the autonomous driving ECU 10*b* of the third embodiment. The autonomous driving ECU 10*d* also corresponds to the vehicle control device. The execution of the processes of the functional blocks of the autonomous driving ECU 10*d* by the computer corresponds to execution of a vehicle control method.

The behavior determination unit 102*d* includes a level specifying unit 121, a long-term and middle-term planning unit 122, and a short-term planning unit 123*d* as sub-functional blocks. The behavior determination unit 102*d* is the same as the behavior determination unit 102*b* of the third embodiment, except that the behavior determination unit 102*d* includes a short-term planning unit 123*d* instead of the short-term planning unit 123*b*. The control execution unit 105*d* includes a speed control unit 151*d* as a sub-functional block. The control execution unit 105*d* is the same as the control execution unit 105*b* of the third embodiment except that the control execution unit 105*d* includes a speed control unit 151*d* instead of the speed control unit 151*b*. The process in the speed control unit 151*d* also corresponds to a speed control process.

The short-term planning unit 123*d* is the same as the short-term planning unit 123*b* of the third embodiment, except that the processing related to the determination of executing the location target speed control is different. The speed control unit 151*d* is similar to the speed control unit 151*b* of the third embodiment, except that the speed control unit 151*d* executes the location target speed control according to the travel plan determined by the short-term planning unit 123*d*. Below, points different from these of the third embodiment will be explained.

The short-term planning unit 123*d* determines not to execute the location target speed control when the travel location of the subject vehicle an intersection, an interchange, or a merge point, even if the subject vehicle is in the autonomous driving with no monitoring obligation. The travel location specified by the location specifying unit 111 may be used as the location where the vehicle is traveling.

The Intersection, the interchange, and the merge point are hereinafter referred to as a target location. The speed control unit 151*d* does not execute the location target speed control when the travel location of the subject vehicle is the target location even during the autonomous driving with no monitoring obligation.

In some cases, the vehicle may go straight without changing direction at the target location. Therefore, when the location target speed control is executed every time the vehicle reaches the target location, the passenger of the subject vehicle may feel a burden. On the other hand, according to the above configuration, it is possible to restrict this burden. It may be preferable that the short-term planning unit 123*d* determines not to execute the location target speed control under a condition that the subject vehicle is planned to go straight through the target location. According to this, it is possible to more accurately restrict the burden felt by the passenger. Here, it may be preferable that the short-term planning unit 123*d* determines not to execute the location target deceleration control of the location target speed control when the travel location of the subject vehicle is the target location. This is because the location target deceleration control of the location target speed control is the burden felt by the passenger much more each time the subject vehicle reaches a target location.

Sixth Embodiment

The present embodiments are not limited to the above-described embodiment, and may be configured as in the sixth embodiment below. The following will describe a detailed example of the sixth embodiment with reference to the accompanying drawings. A vehicle system 1 of the sixth embodiment is similar to the vehicle system 1 of the third embodiment, except that the vehicle system 1 includes an autonomous driving ECU 10*e* instead of the autonomous driving ECU 10*b*.

<Schematic Configuration of Autonomous Driving ECU 10*e*>

Figure 12:
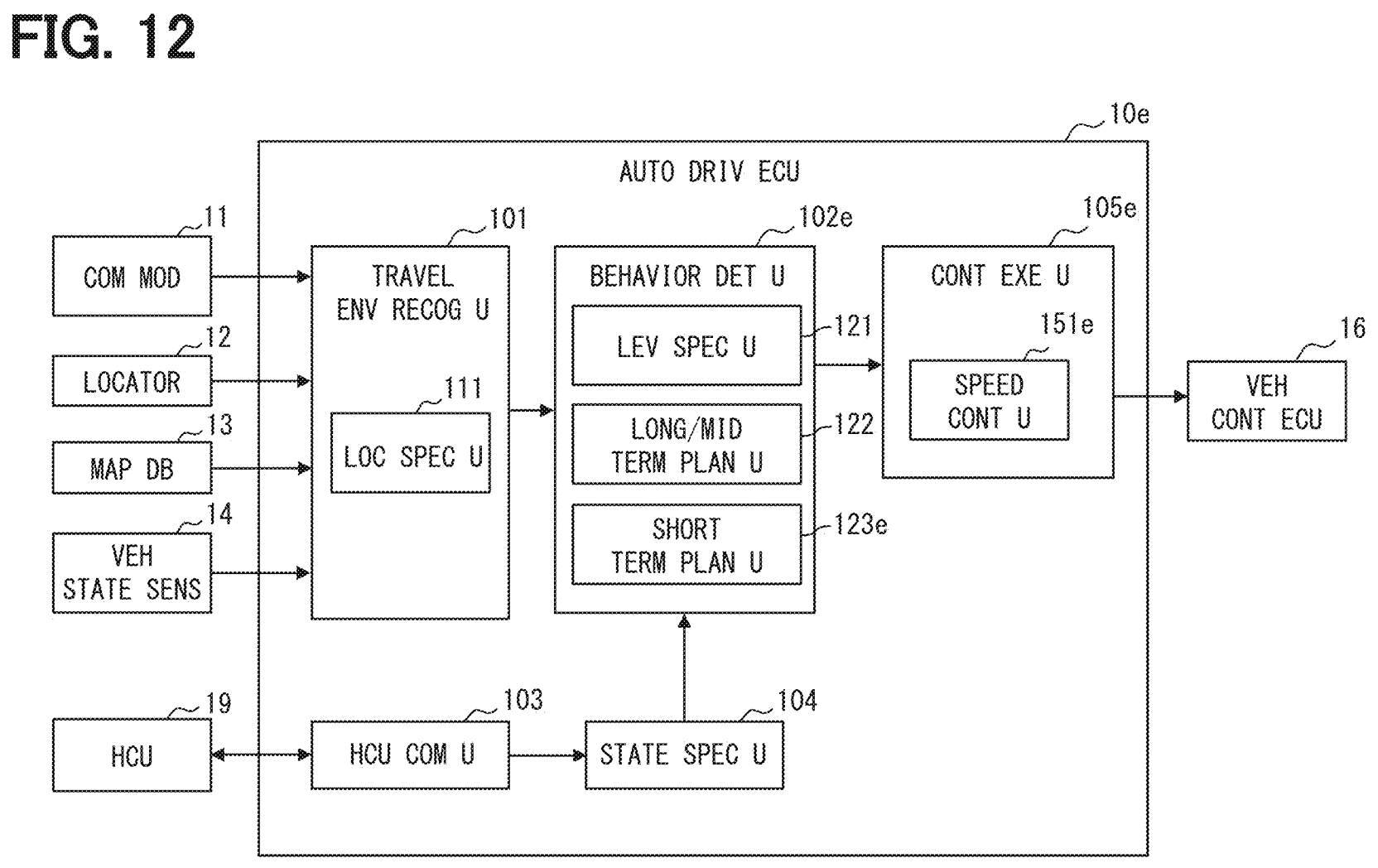

Here, the schematic configuration of the autonomous driving ECU 10*e* will be described using FIG. 12. As shown in FIG. 12, the autonomous driving ECU 10*e* includes a travel environment recognition unit 101, a behavior determination unit 102*e*, an HCU communication unit 103, a state specifying unit 104, and a control execution unit 105*e* as functional blocks. The autonomous driving ECU 10*e* includes a behavior determination unit 102*e* instead of the behavior determination unit 102*b*. The autonomous driving ECU 10*e* includes a control execution unit 105*e* instead of the control execution unit 105*b*. Except for these points, the autonomous driving ECU 10*e* is the same as the autonomous driving ECU 10*b* of the third embodiment. The autonomous driving ECU 10*e* also corresponds to the vehicle control device. The execution of the processes of the functional blocks of the autonomous driving ECU 10*e* by the computer corresponds to execution of a vehicle control method.

The behavior determination unit 102*e* includes a level specifying unit 121, a long-term and middle-term planning unit 122, and a short-term planning unit 123*e* as sub-functional blocks. The behavior determination unit 102*e* is the same as the behavior determination unit 102*b* of the third embodiment, except that the behavior determination unit 102*e* includes a short-term planning unit 123*e* instead of the short-term planning unit 123*b*. The control execution unit 105*e* includes a speed control unit 151*e* as a sub-functional block. The control execution unit 105*e* is the same as the control execution unit 105*b* of the third embodiment except that the control execution unit 105e includes a speed control unit 151e instead of the speed control unit 151b. The process in the speed control unit 151e also corresponds to a speed control process.

The short-term planning unit 123e is the same as the short-term planning unit 123b of the third embodiment, except that the processing related to the determination of executing the location target speed control is different. The speed control unit 151e is similar to the speed control unit 151b of the third embodiment, except that the speed control unit 151e executes the location target speed control according to the travel plan determined by the short-term planning unit 123e. Below, points different from these of the third embodiment will be explained.

The short-term planning unit 123e determines to execute the location target speed control when the subject vehicle is in the autonomous driving with no monitoring obligation and the travel location of the subject vehicle is a road with a slope in a longitudinal cross section greater than or equal to a set value. The road with a slope in a longitudinal cross section greater than or equal to a set value is hereinafter referred to as a slope road. On the other hand, even if the travel location of the subject vehicle is a sloped road, the short-term planning unit 123e determines not to execute the location target speed control when the subject vehicle is in the autonomous driving with monitoring obligation. The travel location specified by the location specifying unit 111 may be used as the location where the vehicle is traveling. The short-term planning unit 123e may specify the slope in the longitudinal cross section based on the map data. The set value here may be a slope in the longitudinal cross section that is estimated to require acceleration or deceleration of the subject vehicle. The set value may be arbitrarily set. The slope road may be uphill or downhill.

The speed control unit 151e execute the location target speed control when the subject vehicle is in the autonomous driving with no monitoring obligation and the travel location of the subject vehicle is a slope road. On the other hand, even if the travel location of the subject vehicle is a slope road, the speed control unit 151e does not execute the location target speed control when the subject vehicle is in the autonomous driving with monitoring obligation.

According to this, even if the acceleration/deceleration is not executed during the autonomous driving with monitoring obligation on a slope road, it is possible to execute the acceleration/deceleration during the autonomous driving with no monitoring obligation. Here, the acceleration/deceleration indicates the acceleration/deceleration by the vehicle control. It is considered that the speed control for maintaining the operation of the subject vehicle more reliably is required during the autonomous driving with no monitoring obligation than during the autonomous driving with monitoring obligation. On the other hand, according to the above configuration, even on the slope road where the acceleration/deceleration is not executed during the autonomous driving with monitoring obligation, the acceleration/deceleration is executed during the autonomous driving with no monitoring obligation, so that it is possible to maintain the operation of the subject vehicle more reliably.

When the system of the subject vehicle is executing the ACC control, the short-term planning unit 123e may determine not to execute the location target speed control even if the travel location of the subject vehicle is a sloped road. In this case, the short-term planning unit 124e may determine to extend the target inter-vehicle distance under the ACC control. In other words, the target inter-vehicle distance may be set to be wider than when the travel location of the subject vehicle is not a sloped road. The travel location specified by the location specifying unit 111 may be used as the location where the vehicle is traveling.

When the system of the subject vehicle is executing the ACC control, the speed control unit 151e may not execute the location target speed control even if the travel location of the subject vehicle is a sloped road. In this case, the control execution unit 105e may extend the target inter-vehicle distance under the ACC control. This control execution unit 105e corresponds to a follow-up travel control unit. If the location target speed control is executed during the ACC control, there is a possibility that the travelling of the subject vehicle to follow up the preceding vehicle will be interrupted. Furthermore, if the location target speed control is executed during the ACC control, there is a possibility that the inter-vehicle distance between the subject vehicle and the preceding vehicle may change suddenly. In this case, a large change in behavior may occur in order to match the target inter-vehicle distance, so that there is a possibility that the passenger feels the burden. On the other hand, according to the above configuration, it is possible to restrict this burden. Furthermore, by extending the target inter-vehicle distance instead of not executing the location target speed control, it is easier to decelerate the subject vehicle smoothly at a point where the deceleration is required. Thus, it is possible to maintain the operation of the subject vehicle more reliably.

<Speed Control Related Process in Autonomous Driving ECU 10e>

Figure 13:
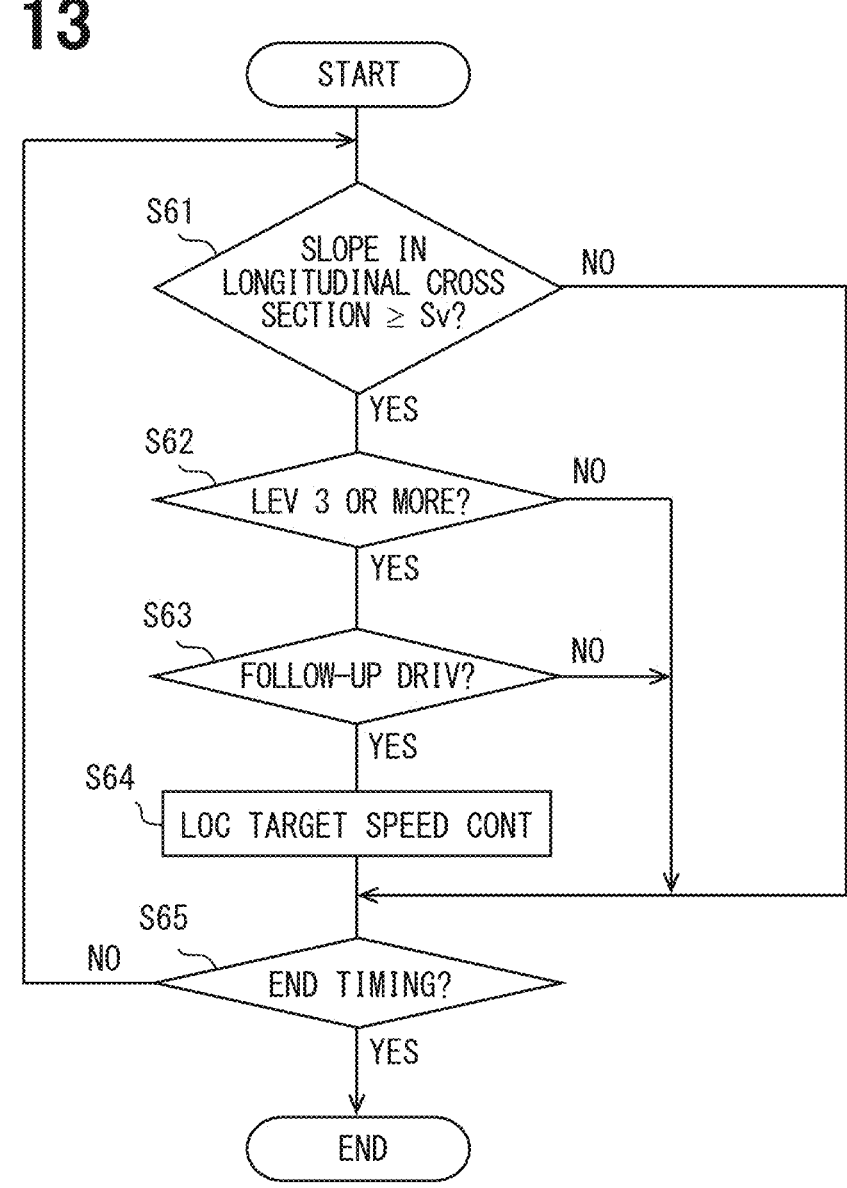
FIG. 13 is a flowchart showing an example of the flow of a speed control related process in the autonomous driving ECU according to the sixth embodiment.

Here, an example of the flow of speed control related process in the autonomous driving ECU 10e will be described using the flowchart in FIG. 13. Here, FIG. 13 describes an example of the flow of the speed control related process when the specific location is a sloped road. The flowchart of FIG. 13 may be configured to be started under a condition that is similar to the condition of the flowchart of FIG. 4.

First, in step S61, if the travel location of the subject vehicle specified by the location specifying unit 111 is a road with a slope in the longitudinal cross section equal to or greater than the set value ("YES" in S61), the process proceeds to step S62. On the other hand, if the travel location of the subject vehicle is not a road with a slope in the longitudinal cross section equal to or greater than the set value ("NO" in S61), the process proceeds to step S65. In FIG. 13, the set value is represented by Sv.

In step S62, if the automation level of the subject vehicle specified by the level specifying unit 121 is LV 3 or higher ("YES" in S62), the process proceeds to step S63. On the other hand, if the automation level is between LV 1 and LV 2 ("NO" in S62), the process proceeds to step S65.

In step S63, if the control execution unit 105e is executing the ACC control ("YES" in S63), the process proceeds to step S64. On the other hand, if the control execution unit 105e is not executing the ACC control ("NO" in S63), the process proceeds to step S65.

In step S64, the short-term planning unit 123e determines to execute the location target speed control. Then, the control execution unit 105e executes the location target speed control, and the process proceeds to step S65. In S65, when it is the end timing of the speed control-related process ("YES" in S65), the speed control-related process ends. On the other hand, when it is yet not the end timing of the speed control-related process ("NO" in S65), the process returns to S61 and repeats the process.

Seventh Embodiment

The present embodiments are not limited to the above-described embodiment, and may be configured as in the seventh embodiment below. The followings will describe an example of a configuration of the seventh embodiment with reference to the drawings.

<Schematic Configuration of Vehicle System 1>

Figure 14:
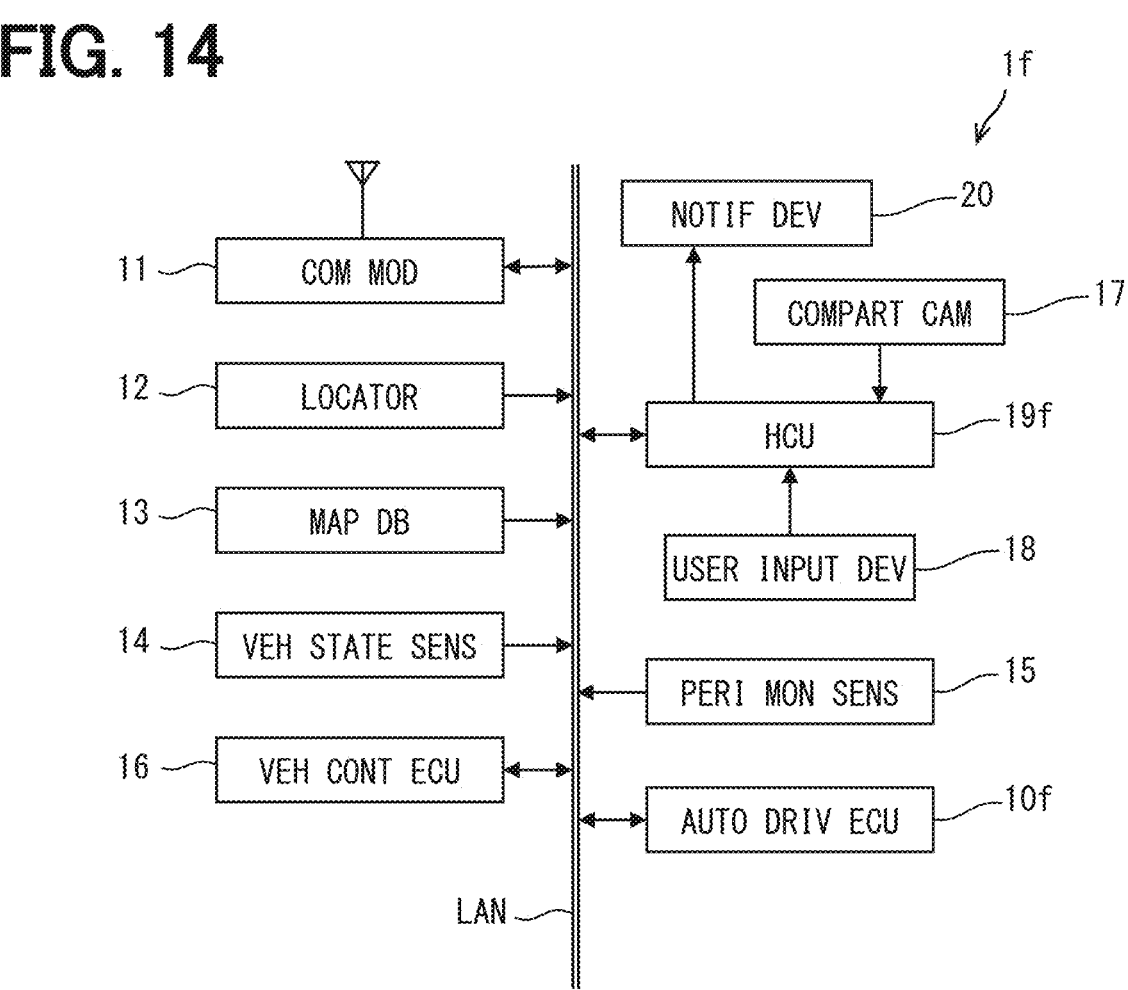
FIG. 14 is a diagram showing an example of a schematic configuration of a vehicle system.

A vehicle system 1*f* shown in FIG. 14 can be used in an autonomous driving vehicle. As shown in FIG. 14, the vehicle system 1*f* includes an autonomous driving ECU 10*f*, a communication module 11, a locator 12, a map DB 13, a vehicle state sensor 14, a periphery monitoring sensor 15, a vehicle control ECU 16, a compartment camera 17, a user input device 18, an HCU 19*f* and a notification device 20. The vehicle system 1*f* includes an autonomous driving ECU 10*f* instead of the autonomous driving ECU 10. The vehicle system 1*f* includes an HCU 10*f* instead of the HCU 10. The vehicle system 1*f* includes a notification device 20. The vehicle system 1*f* is similar to the vehicle system 1 of the first embodiment except for these points.

The notification device 20 is provided in the subject vehicle to notify the passenger of the subject vehicle. The notification device 20 executes notification according to an instruction from the HCU 10*f*. The notification device 20 may provide the notification to at least the driver. The notification device 20 may also notify a passenger other than the driver. The notification device 20 includes, for example, a display and a sound output device. The HCU 10*f* is the same as the HCU 10 of the first embodiment except that the HCU 10*f* controls the notification device 20. The HCU 10*f* controls the notification device 20 according to information input from the autonomous driving ECU 10*f*.

The display device provides the notification by displaying information. The display may be, for example, a meter MID (Multi Information Display), a CID (Center Information Display), or a HUD (Head-Up Display). The meter MID is a display device located in front of the driver seat in the vehicle compartment. As an example, the meter MID may be provided in a meter panel. The CID is a display device disposed at a center of an instrument panel of the subject vehicle. The HUD is provided in, for example, the instrument panel in the vehicle compartment. The HUD projects a display image formed by an projector onto a predetermined projection area on a front windshield as a projection member. A light of the display image reflected by the front windshield to an inside of a vehicle compartment is perceived by the driver seated in the driver's seat. As a result, the driver can visually recognize a virtual image of the display image formed in front of the front windshield which is superimposed on a part of the foreground landscape. The HUD may be configured to project the display image onto a combiner provided in front of the driver's seat instead of the front windshield. The sound output device performs the notification by outputting sound. Examples of the sound output device include a speaker.

<Schematic Configuration of Autonomous Driving ECU 10*f*>

Figure 15:
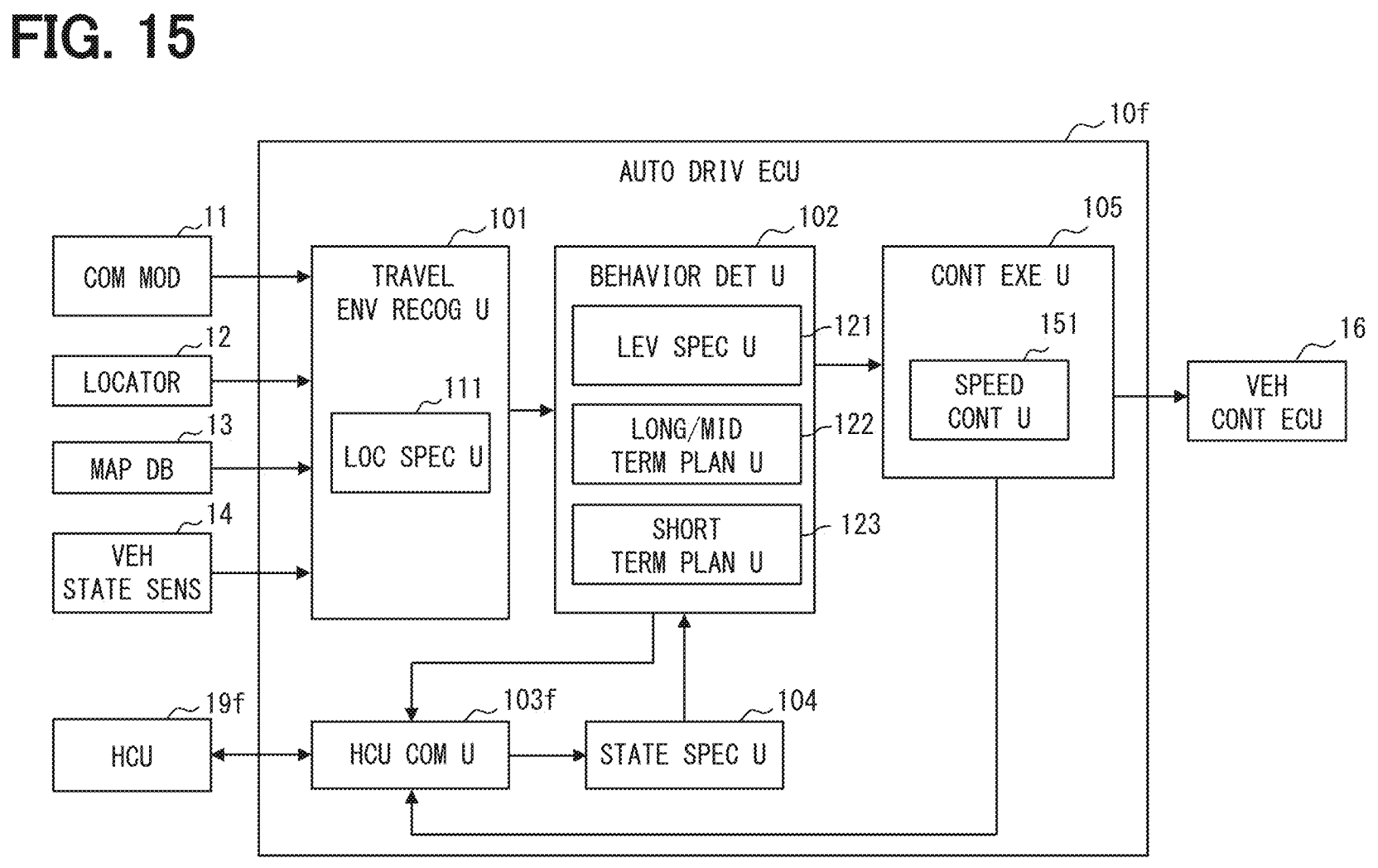

Here, the schematic configuration of the autonomous driving ECU 10*f* will be described using FIG. 15. As shown in FIG. 15, the autonomous driving ECU 10*f* includes a travel environment recognition unit 101, a behavior determination unit 102, an HCU communication unit 103*f*, a state specifying unit 104, and a control execution unit 105 as functional blocks. The autonomous driving ECU 10*f* is the same as the autonomous driving ECU 10 of the first embodiment, except that the autonomous driving ECU 10*f* includes an HCU communication unit 103*f* instead of the HCU communication unit 103. The autonomous driving ECU 10*f* also corresponds to the vehicle control device. The execution of the processes of the functional blocks of the autonomous driving ECU 10*f* by the computer corresponds to execution of a vehicle control method.

The HCU communication unit 103*f* is the same as the HCU communication unit 103 of the first embodiment, except that some processing is different. This different point will be described below. The HCU communication unit 103*f* indirectly controls the notification via the notification device 20 by outputting the information to the HCU 19*f*. When the speed control unit 151 executes the location target speed control, the HCU communication unit 103*f* causes the notification device 20 to execute the control point notification based on the fact that the subject vehicle is in the autonomous driving with no monitoring obligation. When the speed control unit 151 executes the location target speed control, the HCU communication unit 103*f* does not cause the notification device 20 to execute the control point notification based on the fact that the subject vehicle is in the autonomous driving with monitoring obligation. This HCU communication unit 103*f* corresponds to a notification control unit.

The control point notification is notification about a point where the location target speed control is executed. The HCU communication unit 103*f* causes the notification device 20 to execute the control point notification by outputting the information to the HCU 19*f*. The control point notification may be, for example, notification of a point where the location target speed control is to be executed. As an example of the control point notification, the point where the location target speed control is to be executed may be highlighted in the foreground image of the subject vehicle to be displayed on the meter MID. The foreground image may be a bird's-eye view image of the subject vehicle and its periphery, viewed from a virtual viewpoint above the subject vehicle. This virtual viewpoint may be directly above the subject vehicle, or may be at a position deviated from directly above the subject vehicle. The foreground image may be a virtual image for showing the periphery situation of the subject vehicle. The foreground image may be an image by processing a capture image taken by a periphery monitoring camera of the periphery monitoring sensor 15.

When the subject vehicle is in the autonomous driving with no monitoring obligation, there is a high possibility that the passenger is not monitoring the periphery of the subject vehicle. If the passenger is not monitoring the periphery of the subject vehicle, there is a risk that the passenger may surprise when the location target speed control is executed. On the other hand, when executing the location target speed control, it is possible to provide a sense of security to the passenger by executing the control point notification.

When the speed control unit 151 executes the location target speed control, it may be preferable that the HCU communication unit 103*f* does not execute the control point notification if the following condition is met even when the subject vehicle is in the autonomous driving with no monitoring obligation. The condition is a case where the behavior change of the subject vehicle (hereinafter referred to as target behavior change) estimated to occur due to the execution of the location target speed control is equal to or greater than a threshold value. The HCU communication unit 103*f* may determine whether the target behavior change is equal to or greater than a threshold value, for example, based on whether the acceleration applied to the subject vehicle is equal to or greater than a threshold value. As the acceleration (hereinafter referred to as G), lateral G, longitudinal G, and the like may be used. The HCU communication unit 103*f* may estimate the acceleration applied to the subject vehicle from the behavior of the subject vehicle planned by the short-term planning unit 123. The threshold value may be set arbitrarily.

If the behavior change of the subject vehicle caused by the execution of the location target speed control is small, the possibility of surprising the passenger is low even if the location target speed control is executed. If the control point notification is executed in such a case, there is a risk that the passenger will feel burden. On the other hand, according to the above configuration, when the possibility of surprising the passenger is low, it is possible to prevent the control point notification from being executed. As a result, it is possible to make the passenger feel less burden.

When the HCU communication unit 103*f* executes the control point notification, it may be preferable that the control point notification is executed in accordance with the timing at which the location target speed control is executed. In other words, it may be preferable to execute the control point notification simultaneously with the location target speed control. If the control point notification is executed before executing the location target speed control, the passenger may become nervous about the control and may not be able to enjoy their time during the autonomous driving with no monitoring obligation. On the other hand, according to the above configuration, it is possible to notify the passenger the schedule of the execution of the location target speed control, while preventing the passenger from becoming nervous about the control.

<Notification Instruction Related Process in Autonomous Driving ECU 10*f*>

Figure 16:
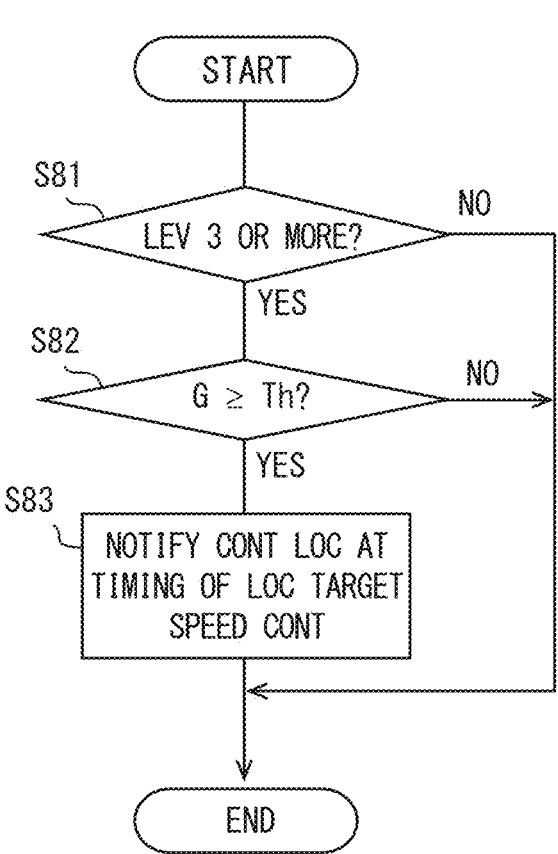
FIG. 16 is a flowchart showing an example of the flow of a notification instruction related process in the autonomous driving ECU.

Here, an example of the flow of process related to the control point notification (hereinafter referred to as notification instruction related process) in the autonomous driving ECU 10*f* will be described using the flowchart of FIG. 16. In addition, in FIG. 16, a configuration may be adopted in which the process starts when the speed control unit 151 executes the location target speed control.

In step S81, if the automation level of the subject vehicle specified by the level specifying unit 121 is LV 3 or higher ("YES" in S81), the process proceeds to step S82. On the other hand, if the automation level is between LV 1 and LV 2 ("NO" in S81), the process proceeds to step S84.

In step S82, the HCU communication unit 103*f* determines whether G due to a behavior change of the subject vehicle that is estimated to occur due to the execution of the location target speed control is equal to or greater than a threshold value. If G is greater than or equal to the threshold value ("YES" in S82), the process proceeds to step S83. On the other hand, if G is less than the threshold value ("NO" in S82), the process proceeds to step S84. In FIG. 16, the threshold value is represented by Th.

In step S83, the HCU communication unit 103*f* causes the control point notification to be executed in accordance with the timing of executing the location target speed control. Then, the notification instruction related process is ended. As an example, the HCU communication unit 103*f* may output to the HCU 19*f* information for causing the control point notification to be executed at the same timing as the location target speed control. Then, under the control of the HCU 19*f*, the control point notification by the notification device 20 may be executed at the same timing as the location target speed control.

Although the seventh embodiment has shown a configuration in which the HCU communication unit 103*f* functions as a notification control unit, the present embodiment is not necessarily limited to this feature. For example, a configuration may be adopted in which the HCU 19*f* functions as the notification control unit. In this case, a configuration including the autonomous driving ECU 10*f* and the HCU 19*f* corresponds to a vehicle control device.

Eighth Embodiment

The present embodiments are not limited to the above-described embodiment, and may be configured as in the eighth embodiment below. The following will describe a detailed example of the eighth embodiment with reference to the accompanying drawings. A vehicle system 1 of the eighth embodiment is similar to the vehicle system 1 of the first embodiment, except that the vehicle system 1 includes an autonomous driving ECU 10*g* instead of the autonomous driving ECU 10.

<Schematic Configuration of Autonomous Driving ECU 10*g*>

Here, the schematic configuration of the autonomous driving ECU 10*g* will be described using FIG. 17. As shown in FIG. 17, the autonomous driving ECU 10*g* includes a travel environment recognition unit 101, a behavior determination unit 102*g*, an HCU communication unit 103, a state specifying unit 104, and a control execution unit 105*g* as functional blocks. The autonomous driving ECU 10*g* includes a behavior determination unit 102*g* instead of the behavior determination unit 102. The autonomous driving ECU 10*g* includes a control execution unit 105*g* instead of the control execution unit 105. Except for these points, the autonomous driving ECU 10*g* is the same as the autonomous driving ECU 10 of the first embodiment. The autonomous driving ECU 10*g* also corresponds to the vehicle control device. The execution of the processes of the functional blocks of the autonomous driving ECU 10*g* by the computer corresponds to execution of a vehicle control method.

The behavior determination unit 102*g* includes a level specifying unit 121, a long-term and middle-term planning unit 122, and a short-term planning unit 123*g* as sub-functional blocks. The behavior determination unit 102*g* is the same as the behavior determination unit 102 of the first embodiment, except that the behavior determination unit 102*g* includes a short-term planning unit 123*g* instead of the short-term planning unit 123. The control execution unit 105*g* includes a speed control unit 151*g* as a sub-functional block. The control execution unit 105*g* is the same as the control execution unit 105 of the first embodiment except that the control execution unit 105*g* includes a speed control unit 151*g* instead of the speed control unit 151. The process in the speed control unit 151*g* also corresponds to a speed control process.

The short-term planning unit 123*g* is the same as the short-term planning unit 123 of the first embodiment, except that the processing related to the determination of executing the location target speed control is different. The speed control unit 151*g* is similar to the speed control unit 151 of the first embodiment, except that the speed control unit 151*g* executes the location target speed control according to the travel plan determined by the short-term planning unit 123*g*. Below, points different from these of the first embodiment will be explained.

The short-term planning unit 123*g* performs the following process when the location target speed control (hereinafter referred to as the location target deceleration control) is executed such that the speed or the speed change is more easily restricted during the autonomous driving with no monitoring obligation, and the lane change of the subject vehicle is performed. The short-term planning unit 123*g* determines to execute the control that makes it easier to restrict the speed or the speed change than when no lane change is performed. Making it easier to restrict the speed or the speed change includes decelerating toward an obstacle around the subject vehicle, maintaining the speed, and reducing acceleration. When executing the location target deceleration control, the control that makes it easier to restrict the speed or the speed change can be regarded as the control in the direction that makes it easier to avoid approaching the obstacle around the subject vehicle. In other words, this can be defined as safer side control. The lane change referred to here is a lane change by the LCA control by the control execution unit 105g. In other words, the system of the subject vehicle automatically changes lanes.

The speed control unit 151g executes the control that makes it easier to restrict the speed or the speed change when executing the location target deceleration control and the subject vehicle changes lanes, compared to when no lane changes is performed. It is considered that the obstacle around the subject vehicle is easily avoidable by restricting the speed or the speed change when executing the location target deceleration control during the autonomous driving with no monitoring obligation and the subject vehicle changes lanes, compared to when no lane changes is performed. Thus, according to the above configuration, in such a case, by executing the control that makes it easier to restrict the speed or the speed change, it is easier to avoid an obstacle around the subject vehicle.

In a case where the short-term planning unit 123g executes the location target deceleration control and the subject vehicle changes lanes, it may be preferable that the short-term planning unit 123g performs the following control when executing the control that makes it easier to restrict the speed or the speed change described above. If there is a specific location within a predetermined distance from the point of lane change destination where the vehicle is likely to be required to decelerate, the speed control unit 151g may determine to restrict acceleration after the lane change is completed. The predetermined distance may be set arbitrarily. Further, the speed control unit 151g may execute the control to restrict the acceleration after the lane change is completed. According to this, it is possible to restrict unnecessary acceleration and improve passenger comfort.

The short-term planning unit 123g performs the following control when executing the location target speed control (hereinafter referred to as the location target acceleration control) that increases the speed much more during the autonomous driving with no monitoring obligation, and when the subject vehicle changes lanes. The short-term planning unit 123g determines to execute the control to increase the speed much more than the case where no lane change is performed. When executing the location target acceleration control, the control to increase the speed much more can be defined as the control in a direction that makes it easier to avoid approaching an obstacle around the subject vehicle. In other words, this can be defined as safer side control. For example, at a merge point where the acceleration is required, the control for increasing the speed much more to be easier to avoid approaching another vehicle behind the subject vehicle after the merging destination road.

The speed control unit 151g executes the control to increase the speed when executing the location target acceleration control and a lane change of the subject vehicle is performed much more than when a lane change is not performed. It is considered that the obstacle around the subject vehicle is easily avoidable by increasing the speed or the speed change much more when executing the location target acceleration control during the autonomous driving with no monitoring obligation and the subject vehicle changes lanes, compared to when no lane changes is performed. Thus, according to the above configuration, in such a case, by executing the control to increase the speed much more, it is easier to avoid an obstacle around the subject vehicle.

In the eighth embodiment, the speed control unit 151g has a configuration in which the speed control unit 151g can execute both the location target deceleration control and the location target acceleration control, but the configuration is not necessarily limited to this feature. For example, the speed control unit 151g may be configured to be able to execute only one of the location target deceleration control and the location target acceleration control.

Ninth Embodiment

The present embodiments are not limited to the above-described embodiment, and may be configured as in the ninth embodiment below. The following will describe a detailed example of the ninth embodiment with reference to the accompanying drawings. A vehicle system 1 of the ninth embodiment is similar to the vehicle system 1 of the first embodiment, except that the vehicle system 1 includes an autonomous driving ECU 10h instead of the autonomous driving ECU 10.

<Schematic Configuration of Autonomous Driving ECU 10h>

Figure 18:
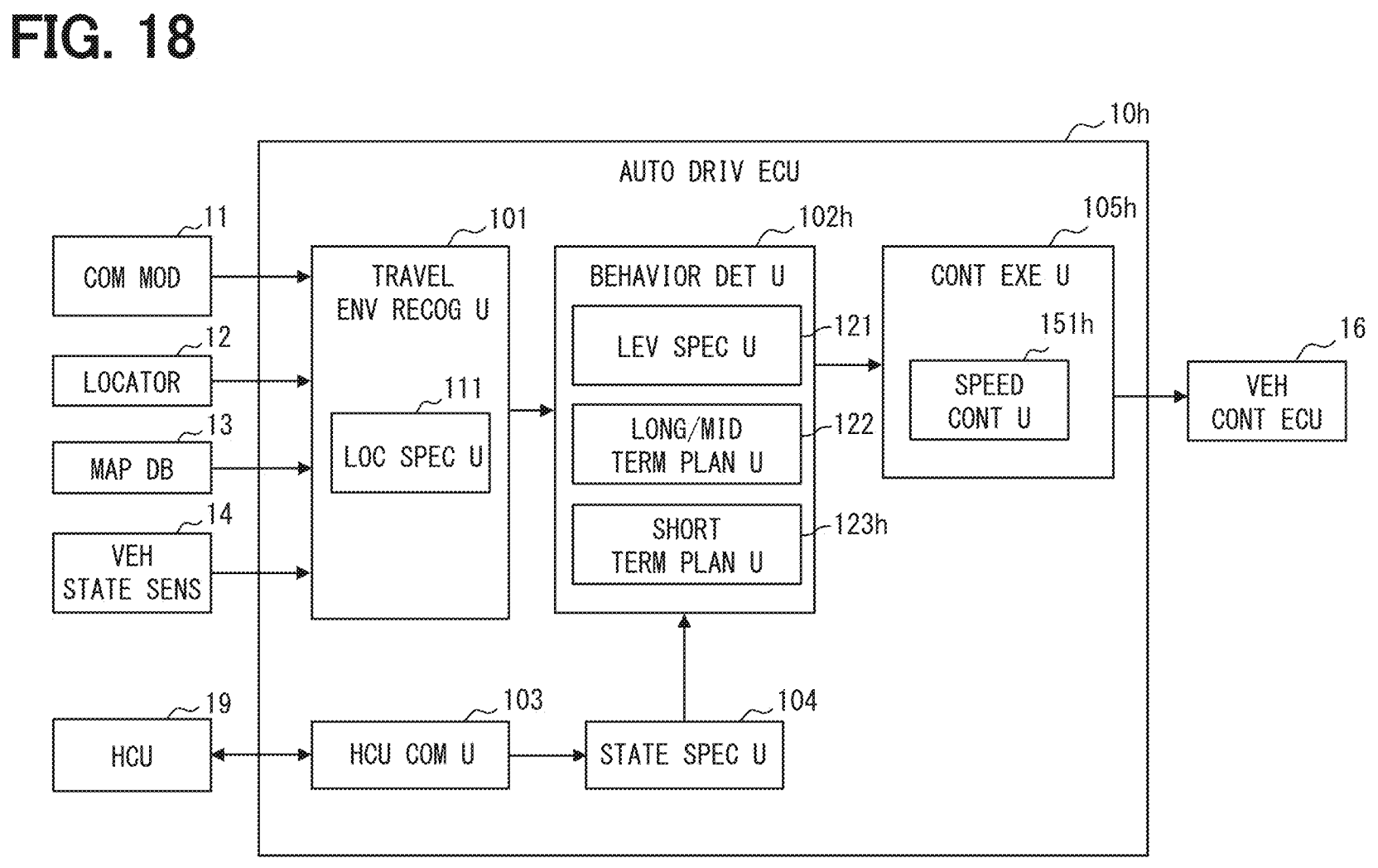

Here, the schematic configuration of the autonomous driving ECU 10h will be described using FIG. 18. As shown in FIG. 18, the autonomous driving ECU 10h includes a travel environment recognition unit 101, a behavior determination unit 102h, an HCU communication unit 103, a state specifying unit 104, and a control execution unit 105h as functional blocks. The autonomous driving ECU 10h includes a behavior determination unit 102h instead of the behavior determination unit 102. The autonomous driving ECU 10h includes a control execution unit 105h instead of the control execution unit 105. Except for these points, the autonomous driving ECU 10h is the same as the autonomous driving ECU 10 of the first embodiment. The autonomous driving ECU 10h also corresponds to the vehicle control device. The execution of the processes of the functional blocks of the autonomous driving ECU 10h by the computer corresponds to execution of a vehicle control method.

The behavior determination unit 102h includes a level specifying unit 121, a long-term and middle-term planning unit 122, and a short-term planning unit 123h as sub-functional blocks. The behavior determination unit 102h is the same as the behavior determination unit 102 of the first embodiment, except that the behavior determination unit 102h includes a short-term planning unit 123h instead of the short-term planning unit 123. The control execution unit 105h includes a speed control unit 151h as a sub-functional block. The control execution unit 105h is the same as the control execution unit 105 of the first embodiment except that the control execution unit 105h includes a speed control unit 151h instead of the speed control unit 151. The process in the speed control unit 151h also corresponds to a speed control process.

The short-term planning unit 123h is the same as the short-term planning unit 123 of the first embodiment, except that the processing related to the determination of executing the location target speed control is different. The speed control unit 151h is similar to the speed control unit 151 of the first embodiment, except that the speed control unit 151h executes the location target speed control according to the travel plan determined by the short-term planning unit 123*h*. Below, points different from these of the first embodiment will be explained.

The short-term planning unit 123*h* may determine not to execute the location target speed control when the subject vehicle is performing the ACC control. When the subject vehicle is performing the ACC control, the speed control unit 151*h* does not need to execute the location target speed control. If the location target speed control is executed during the ACC control, there is a possibility that the travelling of the subject vehicle to follow up the preceding vehicle will be interrupted. Furthermore, if the location target speed control is executed during the ACC control, there is a possibility that the inter-vehicle distance between the subject vehicle and the preceding vehicle may change suddenly. In this case, a large change in behavior may occur in order to match the target inter-vehicle distance, so that there is a possibility that the passenger feels the burden. On the other hand, according to the above configuration, it is possible to restrict this burden.

Tenth Embodiment

In the above-described embodiment, a configuration is shown in which the autonomous driving ECUs 10, 10*b*, 10*c*, 10*d*, 10*e*, 10*f*, 10*g*, and 10*h* are provided with the state specifying unit 104, but the present embodiments are not necessarily limited to this feature. For example, the function of the state specifying unit 104 may be performed by another element other than the autonomous driving ECUs 10, 10*b*, 10*c*, 10*d*, 10*e*, 10*f*, 10*g*, and 10*h*. As an example, the HCUs 19 and 19*f* may provide the function of the state specifying unit 104. In this case, a configuration including the autonomous driving ECUs 10, 10*b*, 10*c*, 10*d*, 10*e*, 10*f*, 10*g*, and 10*h* and the HCUs 19 and 19*f* corresponds to the vehicle control device.

Eleventh Embodiment

In the embodiment described above, a configuration is shown in which the autonomous driving ECUs 10, 10*b*, 10*c*, 10*d*, 10*e*, 10*f*, 10*g*, and 10*h* are provided with the travel environment recognition unit 101 and the location specifying unit 111, but the present embodiments are not necessarily limited to this feature. For example, a configuration may be adopted in which ECUs other than the autonomous driving ECUs 10, 10*b*, 10*c*, 10*d*, 10*e*, 10*f*, 10*g*, and 10*h* provide the functions of the travel environment recognition unit 101 and the location specifying unit 111. In this case, the autonomous driving ECUs 10, 10*b*, 10*c*, 10*d*, 10*e*, 10*f*, 10*g*, and 10*h* acquire the information recognized by the ECUs that have the functions of the travel environment recognition unit 101 and the location specifying unit 111, and specify the travel environment and the travel location. In this case, the functional blocks that specify the travel environment and the travel location in the autonomous driving ECUs 10, 10*b*, 10*c*, 10*d*, 10*e*, 10*f*, 10*g*, and 10*h* correspond to the driving environment specifying unit and the location specifying unit.

Note that the present disclosure is not limited to the above-described embodiments, and various modifications can be made within the scope indicated in the claims, and embodiments obtained by appropriately combining technical means disclosed in different embodiments are also included in the technical scope of the present disclosure. Further, the controller and the method thereof described in the present disclosure may be implemented by a dedicated computer which includes a processor programmed to perform one or more functions executed by a computer program. Alternatively, the device and the method thereof described in the present disclosure may also be implemented by a dedicated hardware logic circuit. Alternatively, the device and the method thereof described in the present disclosure may also be implemented by one or more dedicated computers configured as a combination of a processor executing a computer program and one or more hardware logic circuits. Furthermore, the computer program may be stored in a computer-readable non-transition tangible recording medium as an instruction executed by a computer. (Technical Features Described Above)

This specification discloses multiple technical ideas described in multiple items listed below. Some features may be described in a multiple dependent form, in which subsequent features alternatively refer to preceding features. Alternatively, some features may be described in a multiple dependent form referring to another multiple dependent form. These features described in a multiple dependent form define multiple technical features.
(Technical Feature 1)

A vehicle control device is useable in a vehicle capable of switching between an autonomous driving with no monitoring obligation, which is an autonomous driving operation with no obligation to monitor a periphery of the vehicle, and an autonomous driving with monitoring obligation, which is an autonomous driving operation with obligation to monitor the periphery of the vehicle.

The vehicle control device includes at least one of (i) a circuit and (ii) a processor having a memory storing computer program code. The at least one of the circuit and the processor having the memory is configured to cause the vehicle control device to provide at least one of: a location specifying unit that specifies a travel location of the vehicle; and a speed control unit that executes a location target speed control, which is a speed control with respect to a location as a control target for automatically changing a speed of the vehicle when a travel location of the vehicle specified by the location specifying unit is a specific location where a speed change of the vehicle is likely to be required due to a structure of a road.

The speed control unit executes the location target speed control differently depending on whether the vehicle is in the autonomous driving with monitoring obligation or in the autonomous driving with no monitoring obligation.
(Technical Feature 2)

In the vehicle control device according to the technical feature 1, the speed control unit executes a first location target speed control for restricting the speed or the speed change of the vehicle in the autonomous driving with no monitoring obligation much more than in the autonomous driving with monitoring obligation.
(Technical Feature 3)

In the vehicle control device according to the technical feature 2, the at least one of the circuit and the processor having the memory is configured to cause the vehicle control device to further provide: a state specifying unit that specifies a state of a driver of the vehicle.

The speed control unit determines whether or not the first speed control is executed, depending on whether the state of the driver specified by the state specifying unit is a state in which the driver is performing a second task that is an operation other than a driving task, or a state in which the driver is not executing a periphery monitoring, even in the autonomous driving with no monitoring obligation.

(Technical Feature 4)

In the vehicle control device according to the technical feature 3, the speed control unit determines to execute the first speed control when the vehicle is in the autonomous driving with no monitoring obligation, and the state of the driver specified by the state specifying unit is the state in which the driver is performing a second task that is an operation other than a driving task, or the state in which the driver is not executing the periphery monitoring. The speed control unit determines to execute a second speed control when the vehicle is in the autonomous driving with no monitoring obligation, and the state of the driver specified by the state specifying unit is the state in which the driver is not performing a second task that is an operation other than a driving task, or the state in which the driver is executing the periphery monitoring. The second speed control is the location target speed control in a case where the vehicle is in the autonomous driving with monitoring obligation.

(Technical Feature 5)

In the vehicle control device according to any one of the technical features 2 to 4, the vehicle control device is useable in the vehicle capable of switching between an autonomous driving with sleep permission in which the driver of the vehicle is allowed to sleep and an autonomous driving without sleep permission in which the driver of the vehicle is not allowed to sleep.

The speed control unit executes the first speed control when the vehicle is in the autonomous driving without sleep permission. The speed control unit executes a third speed control when the vehicle is in the autonomous driving with sleep permission.

The third speed control is the location target speed control for restricting the speed or the speed change of the vehicle much more than in the first speed control.

(Technical Feature 6)

In the vehicle control device according to the technical feature 5, the at least one of the circuit and the processor having the memory is configured to cause the vehicle control device to further provide: a state specifying unit that specifies a state of a driver of the vehicle.

The speed control unit executes the third speed control when the vehicle is in the autonomous driving without sleep permission, and the state of the driver specified by the state specifying unit is a sleep state. The speed control unit executes the first speed control when the vehicle is in the autonomous driving without sleep permission, and the state of the driver specified by the state specifying unit is an awake state.

(Technical Feature 7)

In the vehicle control device according to any one of technical features 2 to 6, the speed control unit executes the first speed control that automatically decelerates the vehicle when the travel location of the vehicle specified by the location specifying unit is the specific location where deceleration of the vehicle is likely to be required due to the structure of the road.

When the vehicle is in the autonomous driving with no monitoring obligation, the speed control unit executes, as the first speed control, a control for increasing a degree of deceleration more than in the autonomous driving with monitoring obligation, a control for executing the deceleration more gradually than in the autonomous driving with monitoring obligation, or a control for advancing a start timing of the deceleration earlier than in the autonomous driving with monitoring obligation.

(Technical Feature 8)

In the vehicle control device according to the technical feature 7, the vehicle control device is useable in the vehicle capable of switching, as the autonomous driving with no monitoring obligation, between an autonomous driving limited to traffic congestion and an autonomous driving other than the autonomous driving limited to traffic congestion.

In the autonomous driving limited to traffic congestion, the vehicle is allowed to execute the autonomous driving with no monitoring obligation, which is limited to the traffic congestion.

The speed control unit executes the first speed control when the vehicle is in the autonomous driving with no monitoring obligation other than the autonomous driving limited to traffic congestion. The speed control unit executes the second speed control, which is the location target speed control in a case where the vehicle is in the autonomous driving with monitoring obligation, when the vehicle is in the autonomous driving with no monitoring obligation and in the autonomous driving limited to traffic congestion.

(Technical Feature 9)

In the vehicle control device according to the technical feature 7, the vehicle control device is useable in the vehicle capable of switching, as the autonomous driving with no monitoring obligation, between an autonomous driving limited to traffic congestion and an autonomous driving other than the autonomous driving limited to traffic congestion.

In the autonomous driving limited to traffic congestion, the vehicle is allowed to execute the autonomous driving with no monitoring obligation, which is limited to the traffic congestion.

The speed control unit executes the first speed control when the vehicle is in the autonomous driving with no monitoring obligation other than the autonomous driving limited to traffic congestion. The speed control unit does not execute the location target speed control when the vehicle is in the autonomous driving with no monitoring obligation and in the autonomous driving limited to traffic congestion.

(Technical Feature 10)

In the vehicle control device according to any one of technical features 2 to 6, the speed control unit executes the first speed control that automatically accelerates the vehicle when the travel location of the vehicle specified by the location specifying unit is the specific location where acceleration of the vehicle is likely to be required due to the structure of the road.

When the vehicle is in the autonomous driving with no monitoring obligation, the speed control unit executes, as the first speed control, a control for decreasing a degree of the acceleration more than in the autonomous driving with monitoring obligation, or a control for executing the acceleration more gradually than in the autonomous driving with monitoring obligation.

(Technical Feature 11)

In the vehicle control device according to the technical feature 1, the speed control unit executes the location target speed control in the autonomous driving with no monitoring obligation even if the speed control unit does not execute the location target speed control in the autonomous driving with monitoring obligation.

(Technical Feature 12)

In the vehicle control device according to the technical feature 11, when the travel location of the vehicle specified by the location specifying unit is a curved road with a degree of curvature equal to or greater than a specific value, the speed control unit executes a control for decelerating the vehicle as the location target speed control in the autonomous driving with no monitoring obligation even if the speed control unit does not execute the control for decelerating the vehicle as the location target speed control in the autonomous driving with monitoring obligation.
(Technical Feature 13)

In the vehicle control device according to the technical feature 11 or 12, when the travel location of the vehicle specified by the location specifying unit is an intersection or an interchange, the speed control unit executes a control for decelerating the vehicle as the location target speed control in the autonomous driving with no monitoring obligation even if the speed control unit does not execute the control for decelerating the vehicle as the location target speed control in the autonomous driving with monitoring obligation.
(Technical Feature 14)

In the vehicle control device according to the technical feature 13, the at least one of the circuit and the processor having the memory is configured to cause the vehicle control device to further provide: a route specifying unit that specifies a schedule route for the vehicle.

When the travel location of the vehicle specified by the location specifying unit is an intersection at which the vehicle is scheduled to turn right or left on the schedule route, the speed control unit executes a control for decelerating the vehicle as the location target speed control in the autonomous driving with no monitoring obligation even if the speed control unit does not execute the control for decelerating the vehicle as the location target speed control in the autonomous driving with monitoring obligation.

When the travel location of the vehicle specified by the location specifying unit is an intersection at which the vehicle is scheduled to go straight on the schedule route, the speed control unit does not executes the control for decelerating the vehicle as the location target speed control even in the autonomous driving with no monitoring obligation.
(Technical Feature 15)

In the vehicle control device according to any one of the technical features 11 to 14, when the travel location of the vehicle specified by the location specifying unit is a merge point, the speed control unit executes a control for restricting acceleration of the vehicle as the location target speed control in the autonomous driving with no monitoring obligation even if the speed control unit does not execute the control for restricting the acceleration of the vehicle as the location target speed control in the autonomous driving with monitoring obligation.
(Technical Feature 16)

In the vehicle control device according to the technical feature 11, when the travel location of the vehicle specified by the location specifying unit is an intersection, an interchange, or a merge point, the speed control unit does not executes the location target speed control even in the autonomous driving with no monitoring obligation.
(Technical Feature 17)

In the vehicle control device according to the technical feature 11, when the travel location of the vehicle specified by the location specifying unit is a road with a slope in a longitudinal cross section equal to or greater than a set value, the speed control unit executes the location target speed control in the autonomous driving with no monitoring obligation. When the travel location is the road with the slope in the longitudinal cross section equal to or greater than the set value, the speed control unit does not execute the location target speed control in the autonomous driving with monitoring obligation.
(Technical Feature 18)

In the vehicle control device according to the technical feature 17, the at least one of the circuit and the processor having the memory is configured to cause the vehicle control device to further provide: a follow-up travel control unit that executes follow-up travel control to maintain an inter-vehicle distance between the vehicle and a preceding vehicle at a target inter-vehicle distance.

When the vehicle is executing the follow-up travel control, the speed control unit does not execute the location target speed control even if the travel location of the vehicle specified by the location specifying unit is a road with a slope in a longitudinal cross section equal to or greater than a set value.

When the vehicle is executing the follow-up travel control, and the travel location of the vehicle specified by the location specifying unit is the road with the slope in the longitudinal cross section equal to or greater than the set value, the follow-up travel control unit extends the target inter-vehicle distance.
(Technical Feature 19)

In the vehicle control device according to the technical feature 1, the speed control unit executes a fourth speed control as the location target speed control for maintaining the speed of the vehicle in the autonomous driving with no monitoring obligation more stably than in the autonomous driving with monitoring obligation.
(Technical Feature 20)

In the vehicle control device according to the technical feature 19, the at least one of the circuit and the processor having the memory is configured to cause the vehicle control device to further provide: a state specifying unit that specifies a state of a driver of the vehicle.

When the state of the driver specified by the state specifying unit is a state in which the driver is not executing a periphery monitoring, the seed control unit executes the fourth speed control in the autonomous driving with no monitoring obligation. When the state of the driver specified by the state specifying unit is a state in which the driver is executing the periphery monitoring, the seed control unit executes the second speed control, which is the location target speed control in the autonomous driving with monitoring obligation, in the autonomous driving with no monitoring obligation.
(Technical Feature 21)

In the vehicle control device according to the technical feature 19 or 20, the speed control unit executes the fourth speed control when the travel location of the vehicle specified by the location specifying unit is the specific location where deceleration of the vehicle is likely to be required due to the structure of the road.

The speed control unit executes, as the fourth speed control in the autonomous driving with no monitoring obligation, a control for decreasing a degree of deceleration smaller than in the autonomous driving with monitoring obligation or a control for not decelerating the vehicle.
(Technical Feature 22)

In the vehicle control device according to the technical feature 19 or 20, the speed control unit executes the fourth speed control when the travel location of the vehicle specified by the location specifying unit is the specific location where acceleration of the vehicle is likely to be required due to the structure of the road.

The speed control unit executes, as the fourth speed control in the autonomous driving with no monitoring obligation, a control for decreasing a degree of acceleration smaller than in the autonomous driving with monitoring obligation or a control for not accelerating the vehicle.

(Technical Feature 23)

In the vehicle control device according to the technical feature 1, the at least one of the circuit and the processor having the memory is configured to cause the vehicle control device to further provide: a notification control unit.

When the speed control unit executes the location target speed control in the autonomous driving with no monitoring obligation, the notification control unit executes a control point notification for notification of a point where the vehicle executes the location target speed control. When the vehicle is in the autonomous driving with monitoring obligation, the notification control unit does not execute the control point notification.

(Technical Feature 24)

In the vehicle control device according to the technical feature 1, when the speed control unit executes the location target speed control, the notification control unit executes the control point notification even in the autonomous driving with no monitoring obligation if a behavior change of the vehicle estimated due to an execution of the location target speed control is equal to or greater than a threshold value. When the speed control unit executes the location target speed control, the notification control unit does not executes the control point notification in the autonomous driving with no monitoring obligation if the behavior change is less than the threshold value.

(Technical Feature 25)

In the vehicle control device according to the technical feature 23 or 24, the notification control unit executes the control point notification in accordance with a timing of executing the location target speed control when the control point notification is performed.

(Technical Feature 26)

In the vehicle control device according to the technical feature 1, when executing the location target speed control for restricting the speed or the speed change of the vehicle in the autonomous driving with no monitoring obligation much more than in the autonomous driving with monitoring obligation and executing a lane change of the vehicle, the speed control unit executes a control for restricting the speed or the speed change of the vehicle much more than a case not executing the lane change of the vehicle.

When executing the location target speed control for increasing the speed of the vehicle in the autonomous driving with no monitoring obligation much more than in the autonomous driving with monitoring obligation and executing a lane change of the vehicle, the speed control unit executes a control for increasing the speed of the vehicle much more than a case not executing the lane change of the vehicle.

(Technical Feature 27)

In the vehicle control device according to the technical feature 26, when executing the location target speed control for restricting the speed or the speed change of the vehicle in the autonomous driving with no monitoring obligation much more than in the autonomous driving with monitoring obligation and executing a lane change of the vehicle, the speed control unit executes a control for restricting the speed or the speed change of the vehicle much more than a case not executing the lane change of the vehicle.

When the specific location is disposed within a predetermined distance from a point of a lane change destination, the speed control unit executes a control for restricting acceleration after the lane change is completed.

(Technical Feature 28)

In the vehicle control device according to any one of the technical features 1 to 27, the speed control unit does not execute the location target speed control when the vehicle is executing a follow-up travel control to maintain an inter-vehicle distance between the vehicle and a preceding vehicle at a target inter-vehicle distance.

In the present disclosure, the term "processor" may refer to a single hardware processor or several hardware processors that are configured to execute computer program code (i.e., one or more instructions of a program). In other words, a processor may be one or more programmable hardware devices. For instance, a processor may be a general-purpose or embedded processor and include, but not necessarily limited to, CPU (a Central Processing Circuit), a microprocessor, a microcontroller, and PLD (a Programmable Logic Device) such as FPGA (a Field Programmable Gate Array).

The term "memory" in the present disclosure may refer to a single or several hardware memory configured to store computer program code (i.e., one or more instructions of a program) and/or data accessible by a processor. A memory may be implemented using any suitable memory technology, such as static random-access memory (SRAM), synchronous dynamic RAM (SDRAM), nonvolatile/Flash-type memory, or any other type of memory. Computer program code may be stored on the memory and, when executed by a processor, cause the processor to perform the above-described various functions.

In the present disclosure, the term "circuit" may refer to a single hardware logical circuit or several hardware logical circuits (in other words, "circuitry") that are configured to perform one or more functions. In other words (and in contrast to the term "processor"), the term "circuit" refers to one or more non-programmable circuits. For instance, a circuit may be IC (an Integrated Circuit) such as ASIC (an application-specific integrated circuit) and any other types of non-programmable circuits.

In the present disclosure, the phrase "at least one of (i) a circuit and (ii) a processor" should be understood as disjunctive (logical disjunction) where the circuit and the processor can be optional and not be construed to mean "at least one of a circuit and at least one of a processor". Therefore, in the present disclosure, the phrase "at least one of a circuit and a processor is configured to cause a vehicle control device to perform functions" should be understood that (i) only the circuit can cause a vehicle control device to perform all the functions, (ii) only the processor can cause a vehicle control device to perform all the functions, or (iii) the circuit can cause a vehicle control device to perform at least one of the functions and the processor can cause a vehicle control device to perform the remaining functions. For instance, in the case of the above-described (iii), function A and B among the functions A to C may be implemented by a circuit, while the remaining function C may be implemented by a processor.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle control device for a vehicle capable of switching between an autonomous driving with no monitoring obligation, which is an autonomous driving operation with no obligation to monitor a periphery of the vehicle, and an autonomous driving with monitoring obligation, which is an autonomous driving operation with obligation to monitor the periphery of the vehicle, the vehicle control device comprising:

a location specifying unit that specifies a travel location of the vehicle; and a speed control unit that executes a location target speed control, which is a speed control with respect to a location as a control target for automatically changing a speed of the vehicle when a travel location of the vehicle specified by the location specifying unit is a specific location where a speed change of the vehicle is required due to a structure of a road, wherein:

the speed control unit executes the location target speed control such that the location target speed control in the autonomous driving with monitoring obligation is different from the location target speed control in the autonomous driving with no monitoring obligation.

2. The vehicle control device according to claim 1, wherein:

the speed control unit executes a first location target speed control for restricting the speed or the speed change of the vehicle in the autonomous driving with no monitoring obligation much more than in the autonomous driving with monitoring obligation.

3. The vehicle control device according to claim 2, further comprising:

a state specifying unit that specifies a state of a driver of the vehicle, wherein:

the speed control unit determines whether the first location target speed control is executed, depending on whether the state of the driver specified by the state specifying unit is a state in which the driver is performing a second task that is an operation other than a driving task, or a state in which the driver is not executing a periphery monitoring, even in the autonomous driving with no monitoring obligation.

4. The vehicle control device according to claim 3, wherein:

the speed control unit determines to execute the first location target speed control when the vehicle is in the autonomous driving with no monitoring obligation, and the state of the driver specified by the state specifying unit is the state in which the driver is performing a second task that is an operation other than a driving task, or the state in which the driver is not executing the periphery monitoring;

the speed control unit determines to execute a second location target speed control when the vehicle is in the autonomous driving with no monitoring obligation, and the state of the driver specified by the state specifying unit is the state in which the driver is not performing a second task that is an operation other than a driving task, or the state in which the driver is executing the periphery monitoring; and the second location target speed control is the location target speed control in a case where the vehicle is in the autonomous driving with monitoring obligation.

5. The vehicle control device according to claim 2, wherein:

the vehicle control device is useable in the vehicle capable of switching between an autonomous driving with sleep permission in which a driver of the vehicle is allowed to sleep and an autonomous driving without sleep permission in which the driver of the vehicle is not allowed to sleep;

the speed control unit executes the first location target speed control when the vehicle is in the autonomous driving without sleep permission;

the speed control unit executes a third location target speed control when the vehicle is in the autonomous driving with sleep permission; and the third location target speed control is the location target speed control for restricting the speed or the speed change of the vehicle much more than in the first location target speed control.

6. The vehicle control device according to claim 5, further comprising:

a state specifying unit that specifies a state of a driver of the vehicle, wherein:

the speed control unit executes the third location target speed control when the vehicle is in the autonomous driving without sleep permission, and the state of the driver specified by the state specifying unit is a sleep state; and the speed control unit executes the first location target speed control when the vehicle is in the autonomous driving without sleep permission, and the state of the driver specified by the state specifying unit is an awake state.

7. The vehicle control device according to claim 2, wherein:

the speed control unit executes the first location target speed control that automatically decelerates the vehicle when the travel location of the vehicle specified by the location specifying unit is the specific location where deceleration of the vehicle is required due to the structure of the road; and when the vehicle is in the autonomous driving with no monitoring obligation, the speed control unit executes, as the first location target speed control, a control for increasing a degree of deceleration more than in the autonomous driving with monitoring obligation, a control for executing the deceleration more gradually than in the autonomous driving with monitoring obligation, or a control for advancing a start timing of the deceleration earlier than in the autonomous driving with monitoring obligation.

8. The vehicle control device according to claim 7, wherein:

the vehicle control device is useable in the vehicle capable of switching, as the autonomous driving with no monitoring obligation, between an autonomous driving limited to traffic congestion and an autonomous driving other than the autonomous driving limited to traffic congestion;

in the autonomous driving limited to traffic congestion, the vehicle is allowed to execute the autonomous driving with no monitoring obligation, which is limited to the traffic congestion;

the speed control unit executes the first location target speed control when the vehicle is in the autonomous driving with no monitoring obligation other than the autonomous driving limited to traffic congestion; and the speed control unit executes a second location target speed control, which is the location target speed control in a case where the vehicle is in the autonomous driving with monitoring obligation, when the vehicle is in the autonomous driving with no monitoring obligation and in the autonomous driving limited to traffic congestion.

9. The vehicle control device according to claim 7, wherein:

the vehicle control device is useable in the vehicle capable of switching, as the autonomous driving with no monitoring obligation, between an autonomous driving limited to traffic congestion and an autonomous driving other than the autonomous driving limited to traffic congestion;

in the autonomous driving limited to traffic congestion, the vehicle is allowed to execute the autonomous driving with no monitoring obligation, which is limited to the traffic congestion;

the speed control unit executes the first location target speed control when the vehicle is in the autonomous driving with no monitoring obligation other than the autonomous driving limited to traffic congestion; and the speed control unit does not execute the location target speed control when the vehicle is in the autonomous driving with no monitoring obligation and in the autonomous driving limited to traffic congestion.

10. The vehicle control device according to claim 2, wherein:

the speed control unit executes the first location target speed control that automatically accelerates the vehicle when the travel location of the vehicle specified by the location specifying unit is the specific location where a numerical number of times for requiring acceleration of the vehicle is equal to or greater than a predetermined value due to the structure of the road; and when the vehicle is in the autonomous driving with no monitoring obligation, the speed control unit executes, as the first location target speed control, a control for decreasing a degree of the acceleration more than in the autonomous driving with monitoring obligation, or a control for executing a change in the acceleration to be smaller than in the autonomous driving with monitoring obligation.

11. The vehicle control device according to claim 1, wherein:

the speed control unit executes the location target speed control in the autonomous driving with no monitoring obligation even if the speed control unit does not execute the location target speed control in the autonomous driving with monitoring obligation.

12. The vehicle control device according to claim 11, wherein:

when the travel location of the vehicle specified by the location specifying unit is a curved road with a degree of curvature equal to or greater than a specific value, the speed control unit executes a control for decelerating the vehicle as the location target speed control in the autonomous driving with no monitoring obligation even if the speed control unit does not execute the control for decelerating the vehicle as the location target speed control in the autonomous driving with monitoring obligation.

13. The vehicle control device according to claim 11, wherein:

when the travel location of the vehicle specified by the location specifying unit is an intersection or an interchange, the speed control unit executes a control for decelerating the vehicle as the location target speed control in the autonomous driving with no monitoring obligation even if the speed control unit does not execute the control for decelerating the vehicle as the location target speed control in the autonomous driving with monitoring obligation.

14. The vehicle control device according to claim 13, further comprising:

a route specifying unit that specifies a schedule route for the vehicle, wherein:

when the travel location of the vehicle specified by the location specifying unit is an intersection at which the vehicle is scheduled to turn right or left on the schedule route, the speed control unit executes a control for decelerating the vehicle as the location target speed control in the autonomous driving with no monitoring obligation even if the speed control unit does not execute the control for decelerating the vehicle as the location target speed control in the autonomous driving with monitoring obligation; and when the travel location of the vehicle specified by the location specifying unit is an intersection at which the vehicle is scheduled to go straight on the schedule route, the speed control unit does not executes the control for decelerating the vehicle as the location target speed control even in the autonomous driving with no monitoring obligation.

15. The vehicle control device according to claim 11, wherein:

when the travel location of the vehicle specified by the location specifying unit is a merge point, the speed control unit executes a control for restricting acceleration of the vehicle as the location target speed control in the autonomous driving with no monitoring obligation even if the speed control unit does not execute the control for restricting the acceleration of the vehicle as the location target speed control in the autonomous driving with monitoring obligation.

16. The vehicle control device according to claim 11, wherein:

when the travel location of the vehicle specified by the location specifying unit is an intersection, an interchange, or a merge point, the speed control unit does not execute the location target speed control even in the autonomous driving with no monitoring obligation.

17. The vehicle control device according to claim 11, wherein:

when the travel location of the vehicle specified by the location specifying unit is a road with a slope in a longitudinal cross section equal to or greater than a set value, the speed control unit executes the location target speed control in the autonomous driving with no monitoring obligation; and when the travel location is the road with the slope in the longitudinal cross section equal to or greater than the set value, the speed control unit does not execute the location target speed control in the autonomous driving with monitoring obligation.

18. The vehicle control device according to claim 17, further comprising:

a follow-up travel control unit that executes follow-up travel control to maintain an inter-vehicle distance between the vehicle and a preceding vehicle at a target inter-vehicle distance, wherein:

when the vehicle is executing the follow-up travel control, the speed control unit does not execute the location target speed control even if the travel location of the vehicle specified by the location specifying unit is a road with a slope in a longitudinal cross section equal to or greater than a set value; and when the vehicle is executing the follow-up travel control, and the travel location of the vehicle specified by the location specifying unit is the road with the slope in the longitudinal cross section equal to or greater than the set value, the follow-up travel control unit extends the target inter-vehicle distance.

19. The vehicle control device according to claim 1, wherein:

the speed control unit executes a fourth location target speed control as the location target speed control for setting a maintaining degree of the speed of the vehicle in the autonomous driving with no monitoring obligation to be larger than in the autonomous driving with monitoring obligation.

20. The vehicle control device according to claim 19, further comprising:

a state specifying unit that specifies a state of a driver of the vehicle, wherein:

when the state of the driver specified by the state specifying unit is a state in which the driver is not executing a periphery monitoring, the speed control unit executes the fourth location target speed control in the autonomous driving with no monitoring obligation; and when the state of the driver specified by the state specifying unit is a state in which the driver is executing the periphery monitoring, the speed control unit executes a second location target speed control, which is the location target speed control in the autonomous driving with monitoring obligation, in the autonomous driving with no monitoring obligation.

21. The vehicle control device according to claim 19, wherein:

the speed control unit executes the fourth location target speed control when the travel location of the vehicle specified by the location specifying unit is the specific location where deceleration of the vehicle is likely to be required due to the structure of the road; and the speed control unit executes, as the fourth location target speed control in the autonomous driving with no monitoring obligation, a control for decreasing a degree of deceleration smaller than in the autonomous driving with monitoring obligation or a control for not decelerating the vehicle.

22. The vehicle control device according to claim 19, wherein:

the speed control unit executes the fourth location target speed control when the travel location of the vehicle specified by the location specifying unit is the specific location where acceleration of the vehicle is likely to be required due to the structure of the road; and the speed control unit executes, as the fourth location target speed control in the autonomous driving with no monitoring obligation, a control for decreasing a degree of acceleration smaller than in the autonomous driving with monitoring obligation or a control for not accelerating the vehicle.

23. The vehicle control device according to claim 1, further comprising:

a notification control unit, wherein:

when the speed control unit executes the location target speed control in the autonomous driving with no monitoring obligation, the notification control unit executes a control point notification for notification of a point where the vehicle executes the location target speed control; and when the vehicle is in the autonomous driving with monitoring obligation, the notification control unit does not execute the control point notification.

24. The vehicle control device according to claim 23, wherein:

when the speed control unit executes the location target speed control, the notification control unit executes the control point notification even in the autonomous driving with no monitoring obligation if a behavior change of the vehicle estimated due to an execution of the location target speed control is equal to or greater than a threshold value; and when the speed control unit executes the location target speed control, the notification control unit does not execute the control point notification in the autonomous driving with no monitoring obligation if the behavior change is less than the threshold value.

25. The vehicle control device according to claim 23, wherein:

the notification control unit executes the control point notification in accordance with a timing of executing the location target speed control when the control point notification is performed.

26. The vehicle control device according to claim 1, wherein:

when executing the location target speed control for restricting the speed or the speed change of the vehicle in the autonomous driving with no monitoring obligation to be smaller than in the autonomous driving with monitoring obligation and executing a lane change of the vehicle, the speed control unit executes a control for restricting the speed or the speed change of the vehicle to be smaller than a case not executing the lane change of the vehicle; and when executing the location target speed control for increasing the speed of the vehicle in the autonomous driving with no monitoring obligation to be larger than in the autonomous driving with monitoring obligation and executing a lane change of the vehicle, the speed control unit executes a control for increasing the speed of the vehicle to be larger than a case not executing the lane change of the vehicle.

27. The vehicle control device according to claim 26, wherein:

when executing the location target speed control for restricting the speed or the speed change of the vehicle in the autonomous driving with no monitoring obligation to be smaller than in the autonomous driving with monitoring obligation and executing a lane change of the vehicle, the speed control unit executes a control for restricting the speed or the speed change of the vehicle to be smaller than a case not executing the lane change of the vehicle in the location target speed control; and when the specific location is disposed within a predetermined distance from a point of a lane change destination, the speed control unit executes a control for restricting acceleration after the lane change is completed.

28. The vehicle control device according to claim 1, wherein:

the speed control unit does not execute the location target speed control when the vehicle is executing a follow-up travel control to maintain an inter-vehicle distance between the vehicle and a preceding vehicle at a target inter-vehicle distance.

29. The vehicle control device according to claim 1, further comprising:

at least one of (i) a circuit and (ii) a processor having a memory storing computer program code, wherein:

the at least one of the circuit and the processor having the memory is configured to cause the vehicle control device to provide at least one of: the location specifying unit; and the speed control unit.

30. A vehicle control method for a vehicle capable of switching between an autonomous driving with no monitoring obligation, which is an autonomous driving operation with no obligation to monitor a periphery of the vehicle, and an autonomous driving with monitoring obligation, which is an autonomous driving operation with obligation to monitor the periphery of the vehicle, the vehicle control method, executed by at least one processor, comprising:

a location specifying step for specifying a travel location of the vehicle;

a speed control step for executing a location target speed control, which is a speed control with respect to a location as a control target for automatically changing a speed of the vehicle when a travel location of the vehicle specified in the location specifying step is a specific location where a speed change of the vehicle is required due to a structure of a road, wherein:

in the speed control step, the location target speed control is executed such that the location target speed control in the autonomous driving with monitoring obligation is different from the location target speed control in the autonomous driving with no monitoring obligation.

\* \* \* \* \*